US008814470B2

(12) United States Patent
Belzile et al.

(10) Patent No.: US 8,814,470 B2
(45) Date of Patent: Aug. 26, 2014

(54) OIL CONTAINMENT ASSEMBLY AND METHOD OF USING SAME

(75) Inventors: Bruno Belzile, Toronto (CA); Paula Sinclair, Toronto (CA)

(73) Assignee: Roilblue Corporation, Toronto (CA)

( * ) Notice: Subject to any disclaimer, the term of this patent is extended or adjusted under 35 U.S.C. 154(b) by 16 days.

(21) Appl. No.: 13/816,073

(22) PCT Filed: Aug. 15, 2011

(86) PCT No.: PCT/IB2011/002691
§ 371 (c)(1),
(2), (4) Date: Feb. 8, 2013

(87) PCT Pub. No.: WO2012/020322
PCT Pub. Date: Feb. 16, 2012

(65) Prior Publication Data
US 2013/0129421 A1   May 23, 2013

Related U.S. Application Data

(60) Provisional application No. 61/401,494, filed on Aug. 13, 2010.

(51) Int. Cl.
*E02B 15/06* (2006.01)
(52) U.S. Cl.
USPC ................ 405/63; 405/64; 210/922; 210/923
(58) Field of Classification Search
CPC ..... E02B 15/06; E02B 15/08; E02B 15/0807; E02B 15/0814; E02B 15/0842
USPC .............................. 405/63, 64, 65, 66, 71, 72; 210/922–925
See application file for complete search history.

(56) References Cited

U.S. PATENT DOCUMENTS

| | | | |
|---|---|---|---|
| 3,651,647 A | 3/1972 | Flaviani | |
| 3,802,201 A | 4/1974 | Hoult et al. | |
| 3,839,870 A | 10/1974 | Ryan | |
| 3,943,720 A | 3/1976 | Milgram | |
| 4,033,137 A * | 7/1977 | Geist ............................... | 405/71 |

(Continued)

*Primary Examiner* — Benjamin Fiorello
(74) *Attorney, Agent, or Firm* — D. Peter Hochberg; Sean F. Mellino; Richard A. Wolf

(57) ABSTRACT

A containment machine for containing a contaminant in a body of water includes a set of buoy assemblies arrangeable in the body of water to form the end of a containment barrier for continuing the flow of contaminant in the body of water, cables being extendable from the respective buoy assemblies for holding barrier structure such as a set of truss/curtain assemblies which are connectable to form the containment barrier, a buoy sectional computer control unit in each of said buoy assemblies for receiving signals relating to the location of the respective barrier structure, the tension in the cables and the like, and for transmitting signals to a containment machine central computer control unit. The buoy sectional computer control unit also receives signals from a containment machine central computer control unit to establish set points for adjustment signals sent to the items under its control. Barges for each buoy assembly hold the barrier structure and other equipment for employment in the containment barrier, and a similar computer network exists including a barrier machine central computer control unit and barge sectional computer control units. A process for using the containment machine is also included.

21 Claims, 27 Drawing Sheets

(56) References Cited

U.S. PATENT DOCUMENTS

| | | | | |
|---|---|---|---|---|
| 4,059,962 A | * | 11/1977 | Milgram | 405/72 |
| 5,071,286 A | * | 12/1991 | Separovich | 405/66 |
| 5,232,310 A | * | 8/1993 | Wirkala | 405/68 |
| 6,793,807 B2 | | 9/2004 | Michel, Jr. | |
| 2010/0143038 A1 | * | 6/2010 | Cobb | 405/63 |
| 2011/0274495 A1 | * | 11/2011 | Estes | 405/63 |

* cited by examiner

Detail A

Fig 12
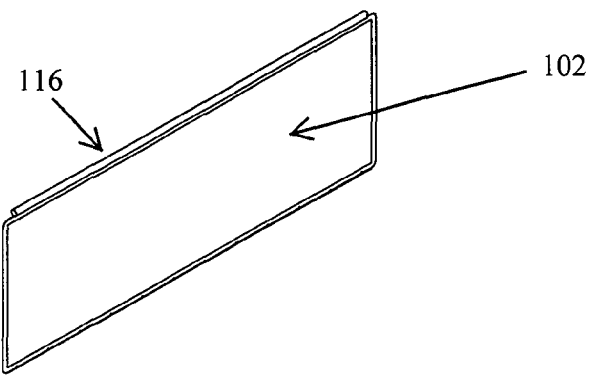
Fig 13
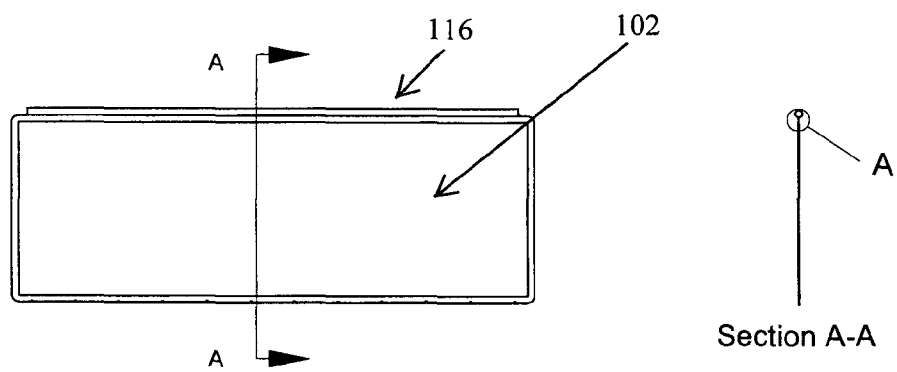
Section A-A
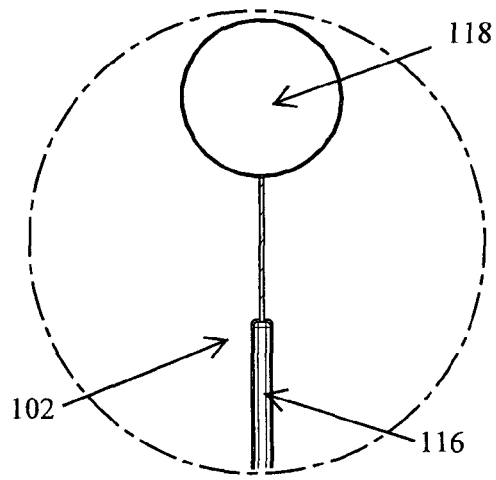
Fig 14
Detail A

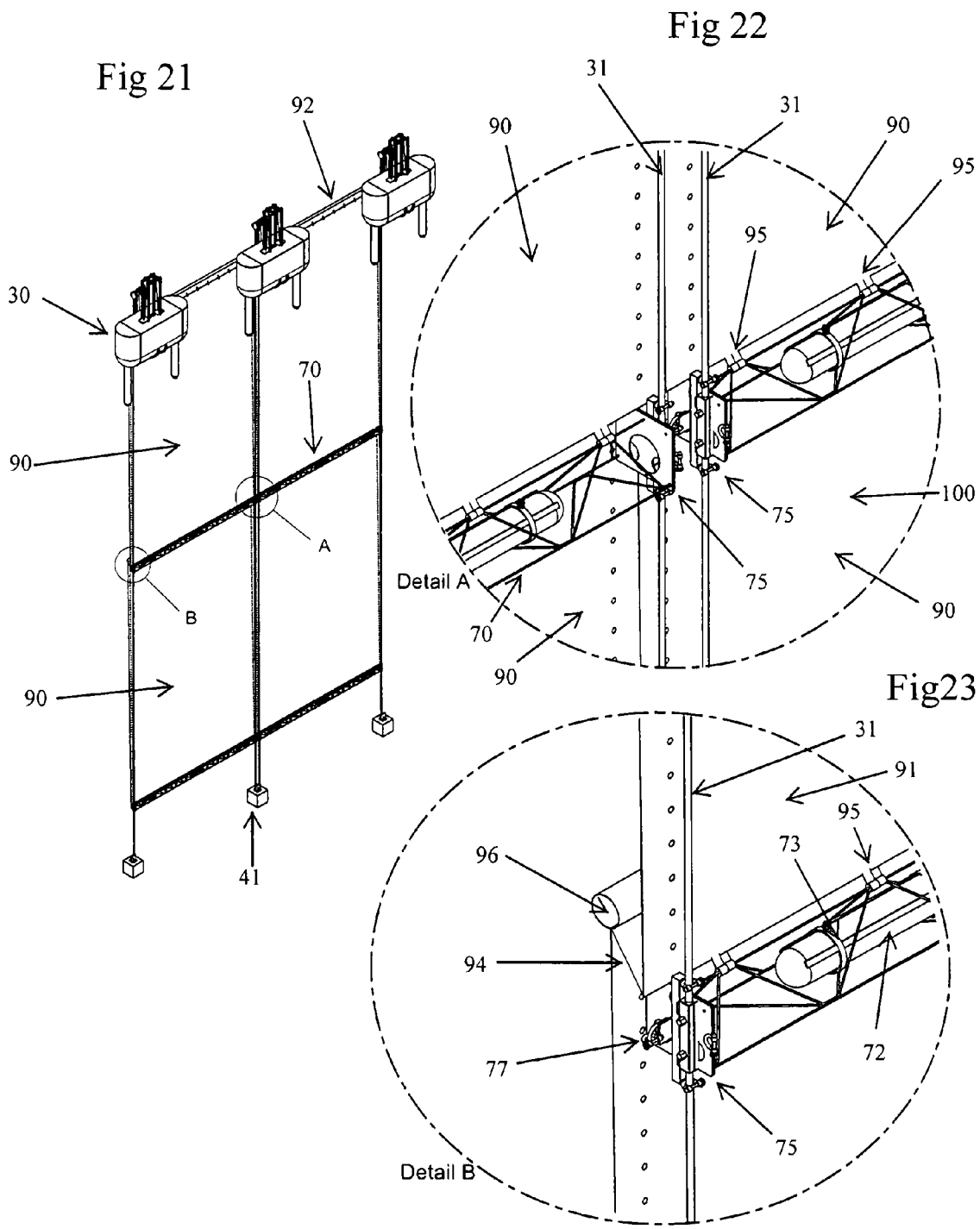

Fig 24
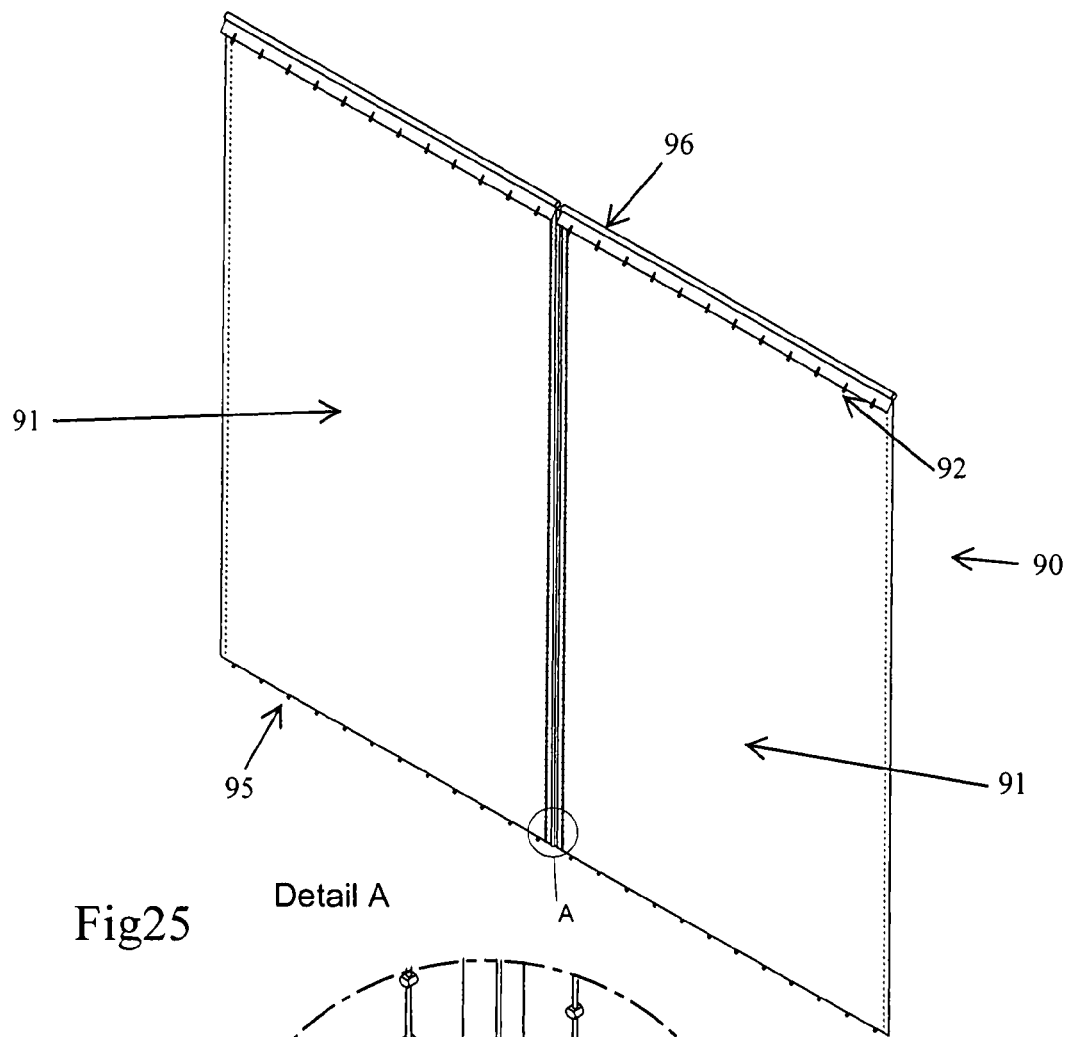
Fig 25  Detail A
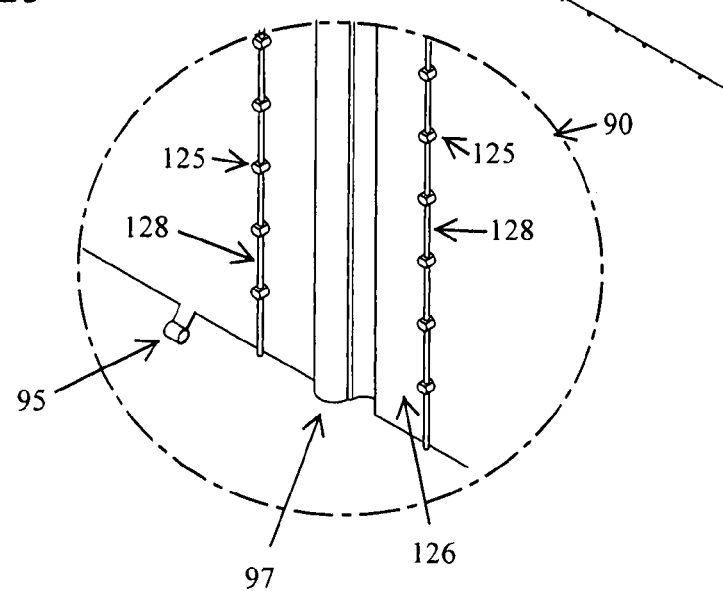

Fig 30
Fig 31
Fig 32
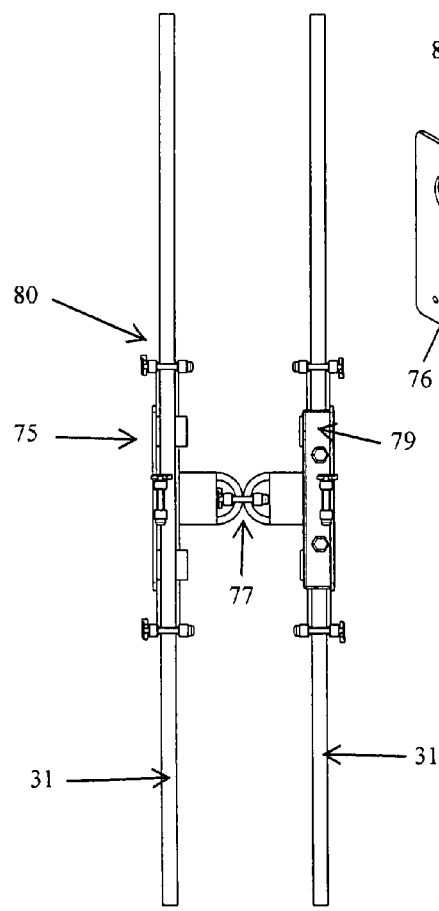
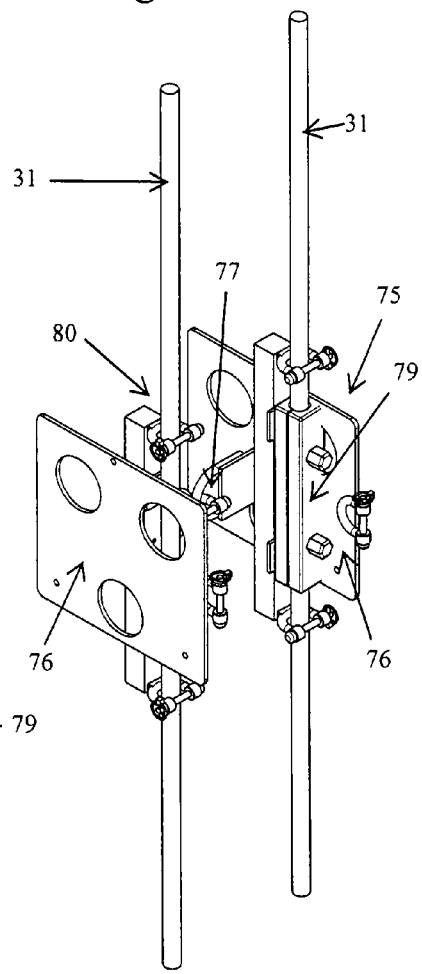
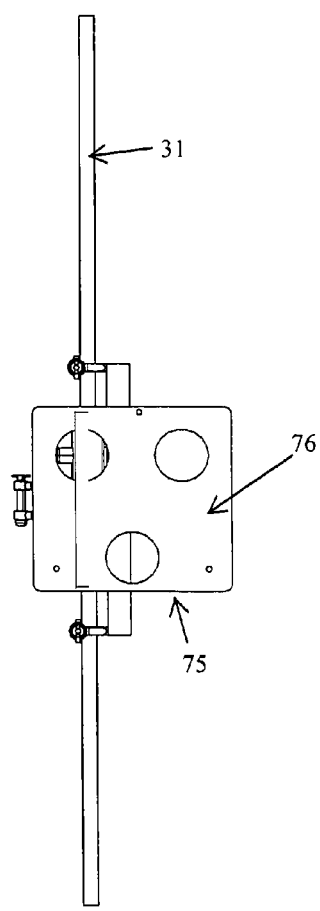

US 8,814,470 B2

OIL CONTAINMENT ASSEMBLY AND METHOD OF USING SAME

CROSS-REFERENCE TO RELATED APPLICATION

This application claims priority of U.S. Provisional Application No. 61/401,494, filed Aug. 13, 2010, under Title 35, United States Code, Section 119(e) which is incorporated herein in its entirety.

BACKGROUND OF THE INVENTION

1. Field of the Invention

This invention relates to the containment of oil or other pollutants along coasts, shores, banks or the like or in the vicinity of offshore oil drilling, production, processing, storage platforms or the like in any body of water. The invention pertains more particularly to a containment assembly for oil or other pollutants in bodies of water involving the preparation and control of a barricade used in the body of water surrounding the oil or other pollutants in the body of water, and the method of using the containment assembly.

2. Technical Field

Oil spills can come from a number of sources, including oil tankers, oil drilling, extraction, processing, transportation and storage.

The Oil Pollution Control Act passed in 1990 requires, among other things that the oil industry take greater precautions against spills and create detailed emergency response plans for cleaning up spills that do occur. To prevent widespread damage when spills occur, attempts are made to contain the spill using absorbent barriers or booms or to either skim or burn oil off the water's surface. Devices and methods for containing oil spills on marine surfaces are known in the art. Also, new bioremediation technologies are being developed using microorganisms to break the hydrocarbons down into less harmful compounds. When oil or other pollutant spills occur, these interventions to contain the spill take time to execute and are not good at containing the spread of the pollutant. For example, methods employed by BP to stop the leak or blowout in the Gulf of Mexico by shooting heavy drilling mud into the blown-out well 5,000 feet underwater or drilling relief wells took weeks and many attempts to realize results Because it is impossible to completely eliminate the risk of contaminant spills on or in water during the extraction, processing, and transportation, it is important to have a well-designed plan in place that can be used to limit the spread. This invention can be ready and quickly deployed to drastically contain the spread of any contaminant. Effort has been made to design the apparatus in ways and using materials that are known and readily available, to facilitate speed of detail engineering, specification and deployment.

SUMMARY OF THE INVENTION

It is an object of the present invention to provide a containment system of oil or other pollutants in a body of water.

It is another object of the present invention to provide a containment system for oil or other pollutants in a body of water which includes at least one containment machine that can rapidly be prepared for operation and put into use.

It is a further object of the present invention to provide a containment machine for oil or other pollutants in a body of water that can be suspended in the body of water around the oil or other pollutants to set up a barricade to contain the oil or other pollutants within the barricade.

Another object of the present invention is to provide a containment machine as set forth above which is in modular form and can be rapidly set up for operation.

A still further object is to provide an oil or other pollutant-containment machine for a body of water, including a series of buoy assemblies which are arrangeable in a loop or other closed or partially closed shape to establish an upper end of the machine in the body of water, an electronic machine control assembly for controlling various components operatively connected to the respective buoy assemblies, and a barricade suspended from the buoy assemblies to block or impede the flow of oil or other pollutants through the barricade, where the buoy assemblies each has respectively an electronic machine control assembly (or buoy sectional computer control unit).

Another related object of the present invention is to provide the containment machine where the barricade is open at its top and its bottom to enable large volumes of oil or other contaminant to be contained and removed such as by shuttle tankers.

Another related object of the present invention is to provide the containment machine where the barricade can close at its top and open at its bottom to enable large volumes of oil to be contained and removed such as by shuttle tankers.

Yet another related object of the invention is to provide an oil or other pollutant-containment machine for a body of water as set forth above where the barricade can be lowered or raised in the body of water by apparatus on the buoy assemblies under the control of the electronic containment machine central computer control unit, the lowering or raising being based on such factors as depth of the body of water, conditions in the body of water ambient to the system, the stability of the respective buoy assemblies and the condition of the other buoy assemblies and barricades suspended therefrom.

It is still a further related object of the present invention to provide a containment machine as described above where the respective buoy assemblies have an appropriate keel structure to assist in maintaining the stability of the buoy assembly and of the containment machine.

It is yet another object to provide as part of the barricade one or more items which have a compact condition for storage and for transport, and an enlarged condition for acting as a barrier to contaminants in the body of water.

Yet another related object of the present invention is to provide a buoy and barricade assembly for the containment machine where the barricade includes a series of curtains extending between the surface of the body of water to near the depth of the body of water, and arranged in a general tubular form to contain the oil or other pollutants within the barricade.

It is furthermore another related object of the present invention to provide a buoy and barricade assembly as described above where the buoy assemblies have an adjustable ballast apparatus which is adjustable in a controlled manner by the containment machine central computer control unit based on various factors affecting the buoy assembly.

A related object is to provide a buoy and barricade assembly where the buoyancy of the respective buoy assemblies is adjustable by means of a ballast pump operated under the control of the containment machine central computer control unit and buoy sectional computer control units.

Another related object of the present invention is the provision of a buoy and barricade assembly as described above where the barricade comprises a series of truss assemblies to which are attached curtain assemblies which are connectable between the surface of the body of water to near the depth of the body of water in a vertical direction, and side-by-side to form a general tubular assembly for containing the oil or other pollutants in position on the body of water within the tubular assembly.

It is still an additional related object of the invention to provide the respective truss assembly and curtain assembly which is buoyant and in effect weightless in the body of water to facilitate its movement under the controls effected by the buoy sectional computer control unit and the containment machine central computer control unit.

Another related provision of the invention is to provide a buoy assembly operatively connected to one or more respective truss assemblies and curtain assemblies by means of winches, cables to the respective truss assemblies and curtain assemblies, pulleys, and tension load cells, with respective motors and drive trains for operating the winches, under the control of the containment machine central computer control unit and the buoy sectional computer control unit, where data is transmitted, and control commands and set points are issued in real time.

Another related provision of the invention is to provide a number of operatively connected computer control system components that issue control commands, set points, and other information-based instructions to control loops, which periodically update output control signals to various hardware which cause machine operation and action changes.

It is another related object of the invention to provide the containment machine central computer control unit and the buoy sectional computer control unit having the appropriate Supervisory Control and Data Acquisition (SCADA) hardware and software.

It is still a further related object of the invention to further incorporate an anchor structure for the respective buoy assemblies which is connected to the respective buoy assemblies based on the location of the respective buoy assemblies and on the depth of the body of water where the respective buoy assemblies are to be located.

Another related object of the present invention is the provision of an anchor assembly for the respective buoy assemblies where the anchor assembly includes an anchor which is part of and attached to a respective buoy assembly by one or more cables windable within the respective buoy assemblies by appropriate guides and rollers under the control of motor-run winches, where the respective motors are controlled by the electronic containment machine central computer control unit and buoy sectional computer control units.

Another related object of the invention is to provide buoy assemblies as described above which can be adapted to several modes, one for transport to a location in a body of water, one for deployment and recovery, and one for operation.

Yet still a further related object of the invention is to provide a truss assembly as described above with effective and efficient buoyancy tanks.

Another related object of the invention is to provide a truss assembly as discussed above having elements for attaching the respective truss assembly to a corresponding curtain assembly being suspended therefrom, and to adjacent truss assemblies and curtain assemblies located on either side thereof.

It is another related object of the invention to provide a buoy assembly comprised of winch control loops, depth control loops, wireless or tethered communication with other components of an overall control system, components for acquiring data from different variables relating to the respective buoy assemblies, and from the respective truss assemblies and curtain assemblies, the data relating to conditions of the body of water, components for monitoring the integrity of the overall containment machine and components thereof, components for monitoring weather conditions and components for monitoring the installation state of the inventive containment machine.

It is another related object of the invention to provide redundancy for the containment machine central computer control unit, the buoy sectional computer control unit and the buoy assembly, the buoy assembly including a generator, wireless radio equipment, absolute position sensors for the respective lines and cables, and a GPS for positioning the respective components of the inventive buoy assembly and containment machine.

Another related object of the invention is to provide an electronic buoy sectional computer control unit for each of the respective buoy assemblies for managing each section of containment rings of a containment machine.

An additional related object of the present invention is to provide an oil or pollutant containment system for a body of water, where the containment system is set up as a group of containment machines operating independently, including the operation of respective motors and mechanical devices under specified computer-driven set of parameters, each control unit using a personal communication network.

It is a further related object of the present invention to provide an oil or other pollutant-containment machine for a body of water where the containment machine is adapted to be put in place to achieve the containment by barges holding respective containment machine components, the containment machine being composed respectively of buoy assemblies with electronic buoy sectional computer control units, truss assemblies connected to curtain assemblies, and apparatus on the respective buoy units to control the lowering and raising the truss/curtain assemblies based on data collected on the variables which could affect the operation of the respective components of the containment machine.

These and other objects can be determined from the description to follow and from the appended claims.

In the preferred embodiment of the invention discussed below, a containment machine is described as having an item or items to form a contaminant barrier. The item or items have a compact or collapsed condition for facilitating the storage and transport of a containment machine, and an enlarged condition for forming the containment barrier when in a body of water. This item or items is described generally herein as a "barrier structure," and the barrier structure in the preferred embodiment of the invention is a truss/curtain assembly. Other versions of the barrier structure include rolled-up materials which can be rolled up to the compact condition, materials stored in concertina fold in the compact condition and unfolded in the enlarged condition and the like. Also, the central computer central computer control is described as a "containment machine central computer control unit." However, the central computer control need not be confined to a hardware unit but could include software systems. In its broad sense, the central computer control is referred to as a "containment machine central computer control." Likewise, the buoy sectional computer control is described in the preferred embodiment as a "buoy sectional computer control unit," but it too could include software systems instead of hardware in a hardware unit. In its broad sense it is referred to herein as a "buoy sectional computer control." A flexible, floating containment system according to the preferred embodiment of the invention is comprised of at least one containment machine having a series of buoy assemblies with anchors and truss/curtain assemblies. The containment machine has components that are pre-fabricated and available as modules. The truss/curtain assemblies remain on barges and the buoy assemblies are tethered together ready for towing in the vicinity of offshore oil drilling, production, processing, storage platforms or the like in any body of water. They are erected on location when needed using barges and cranes mounted thereon. The buoy assemblies are composed of:
- winches, complete with cables, tension load cells, motors, drive trains or the like;
- ballast control pumps; and
- buoy sectional computer control unit, including data (SCADA) hardware and software;
- keels and controls for the keels (keels may be removable if required for transportation);
- installation carriage to facilitate installation;
- system of pulleys and carriages to facilitate deployment and removal; and
- an anchor sized for depth and marine conditions.

The term "buoy assembly" means any item which functions as a buoy, which could be a water vessel of some sort.

Ballasts located in the respective buoy assemblies and two adjustable keels projecting from the bottom of a buoy hull which control upright floatation apparatus are provided according to the preferred embodiment of the invention. The buoy assemblies are positioned a truss length apart. From a plan perspective, the buoy assemblies form the outline which will ultimately determine the shape of the closed containment machine. The ballasts, control pumps, winches and electronic buoy sectional computer control unit are located inside the buoy assembly. An anchor hangs from the bottom of the respective buoy assemblies and is attached to cables that are wound around the pulleys to the winches inside the buoy assembly. The length of the cable is determined by the location of the contaminant and the depth of the body of water that needs to be protected. From the winches, the cables are externalized as they run through water seals to the pulleys in the top of the buoy assembly, and down through cable guide pipes exiting the bottom of the buoy assembly. An installation carriage, composed of external guides, rollers, and a cable trolley are used in the buoy assemblies so that the external cables are accessible during the loading embodiment. The buoy assembly can be in one of three "modes," namely:
- a sea transport mode, where an anchor secured directly under the buoy assembly and the installation carriage in a rest position;
- a deployment and recovery mode, in which the anchor is down, the installation carriage out to the side; and
- an in-place operation, where the anchor is down, and the installation carriage in a rest position.

The truss/curtain assembly is comprised of:
- a truss assembly, including:
- buoyancy tanks;
- a truss;
- truss end plates, shackles, and possibly side guides for ropes and buoy anchor arrangements; and
- an arrangement at the top of the truss for facilitating the attachment of the top of the lower curtain during installation; and
- a curtain assembly, which includes:
- a containment curtain;
- a curtain flotation band;
- curtain side fasteners; and
- a curtain top flap.

The truss/curtain assembly is prefabricated and loaded onto barges. The truss/curtain assemblies are preferably available as modules and are assembled when needed. The shape, length and material of the truss assembly are determined based on marine conditions in the vicinity of the offshore oil drilling, production, processing, storage platforms or the like that the invention is meant to protect in the event of a contaminant spill. Buoyancy tanks that are part of the assembly are pre-attached to the respective truss assemblies. The buoyancy tanks can be pressurized for different depths. Truss end-plates and shackles are used to loosely connect the truss assemblies end-to-end during deployment.

A variety of curtain materials, thicknesses, sizes and configurations for the curtain assemblies are available depending on marine conditions and types of spills. Curtain materials include PVC coated polyester fabric, steel, aluminum, and the like. Rigid curtain material like aluminum, steel and the like are preferably fabricated as two plates separated by buoyant material. The buoyant material is advantageously located at the top of the fabric or flexible curtain, and creates a constant upward, positive curtain tension away from the bottom truss assemblies connected to the cables. In all designs, each curtain assembly is buoyant. When deployed, the curtain assemblies are fastened to the cables which extend from the winches located in the buoy assemblies down to the anchors sitting on the sea bed floor. Electronic buoy sectional computer control units are located in the buoy assemblies and are used to maintain a constant tension on the cables at all times and to monitor and acquire data from sensors located on the truss assemblies.

Curtain assemblies are pre-attached to the truss assemblies and loaded onto the barges. Aluminum and steel curtain panels are transported either laying flat or braced upright. The fabric curtains and their truss assemblies can be rolled up and laid flat on the barges.

The containment machine is comprised of the following:
containment machine central computer control unit, to do real time controls and Supervisory Control and Data Acquisition (SCADA) including the following:
- winch control loops;
- depth control loops;
- data acquisition components;
- water quality monitoring components
- structure integrity monitoring components;
- buoy ballasts controls;
- weather monitoring components;
- Human Machine Interface (HMI); and
- installation components; and
- hardware to support the containment machine central computer control units which include the following:
  - Remote Terminal Unit (RTU) or the like device including a Computer Control Unit which is an industrial grade system and network;
  - uninterruptable power supply (UPS);
  - wireless radio equipment and/or tethered communication;
  - redundant Computer Control Units;
  - absolute position sensors for rope location; and
  - GPS for positioning.

Containment machine central computer control units of the containment machine are operated remotely, and are operatively connected to buoy sectional computer control units. The latter are respectively located in each buoy assembly and are used to manage each section of the containment machine. Sensors operatively connected to the buoy sectional computer control units are located on each truss assembly. The combination of buoy sectional computer control units and sensors creates a large containment machine that manages a plurality of generator sets, motors and motor drives for constant control and feedback of the apparatus function and operational conditions. The containment machine central control unit operates in real time, and provides "set points" and control commands to the buoy assembly and barge assembly sectional computer controls, as discussed below, to be used in their control loops, including feedback, to continuously adjust the machine operation in real time.

Each buoy sectional computer control unit operates independently within its own "sphere of control." Specific responsibilities of each buoy sectional computer control unit includes the operation of the respective buoy assembly motors and mechanical functions within a specified computer driven set of parameters, using its own "personal area" communications network.

All buoy sectional computer control units are in constant communication with the containment machine central computer control unit. The containment machine central computer control unit is responsible for control of the overall containment machine functions of the entire apparatus including the relationship of each of the independent buoy sectional computer control units to each other and communications to the outside world. Each buoy sectional computer control unit receives parameters of operation from the containment machine central computer control unit and constantly submits sensor information back to the containment machine central computer control unit so that the quality of operations is monitored at all times. This is all done in real time. All parts of the containment machine system will need to be appropriate for the environment they will be operating in. They must be explosion-proof where required and comply with appropriate national electric codes and regulations. Redundancy and safety considerations will also be met.

The buoy sectional computer control unit housed in each buoy assembly lowers or raises the anchor of the buoy assembly, increases or decreases the tension of the cables or ropes, raises and lowers its section of the "containment arrangements" which are composed of truss/curtain assemblies. Each level of the combination of barrier structures in the containment machine, which in the preferred embodiment means each level of interconnected truss assemblies and curtain assemblies when the combination is in a body of water, is expected to be in the form of a ring, and the term "containment ring" is used substantially herein. However, there may be some situations due, for example, to water currents at certain levels in the body of water, where a ring would not be as effective as some other arrangement which would not require a closed loop at all. The broad term used herein for the shape of the combination of barrier structures at each level of this part of the containment machine is used herein a "barrier arrangement." Each buoy sectional computer control unit is programmed to read its assigned sensors and perform its assigned functions (sometimes using feedback loops) in its prescribed area of control so that its buoy sectional computer control unit is acting appropriately for its position in the overall containment machine. For example, when the containment machine central computer control unit instructs each of the buoy assemblies to lower the truss/curtain assembly in a containment ring at a specific rate, each buoy assembly will lower it in coordinated fashion, even though each buoy sectional computer control unit may have variations of requirements in its specific microcosm that it is managing for itself. Each buoy sectional computer control unit controls the speed of its specific operation to ensure that it is continuously meeting the "set point" issued by the containment machine central computer control unit. The "set point" is continuously adjusted due to real-time commands from the containment machine central computer control.

This large containment machine will generally be making movements with a long time base. Things will be moving relatively slowly.

There are two separated sets of machines that will be working under computer control. Under some operating conditions there may be more than one containment machine central computer control unit, most probably installation and deinstallation, there could be an overall central computer control unit for controlling the operation of each of the containment machine central computer control units and the barge machine central computer control unit discussed below. The foregoing two separate machines are the following:

1. The containment machine, which has:
    a containment machine central computer control unit;
    a containment machine SCADA system;
    a plurality of buoy sectional computer control units (one unit in each buoy assembly); and
    software specific to the containment machine.
2. The Barge Machine, which aids in the installation and contaminant collection, includes:
    a barge machine central computer control unit;
    a barge machine SCADA system;
    a plurality of barge machine sectional computer control systems (one system for each barge); and
    software specific to the barge machine.

The containment machine central computer control unit is located apart from the overall structure/machine on a ship, tug boat or the like, and includes:
    computer control unit, or RTU or C-WAVE (a particular type of industrial grade system and networks) or the like for computer control of all the assemblies;
    communication structure for communicating with all other computer control units, or RTUs or C-WAVES on the buoy sectional computer control units via Wireless Personal Area Network (WPAN) or Wired or Optical Personal Area Network (PAN) or the like;
    communication networks with Internet to outside world, including WIFI, cellular or the like;
    communication with containment SCADA system;
    means for human machine interface. This is the main way that people interact with the containment machine, and it may be via the computer control units, or RTUs or C-WAVE, containment assembly SCADA system, or another computer hooked into the network; and
    monitoring sensors, as required.

All physical pieces preferably should have full redundancy and be operating in "hot" back-up mode (i.e., able to take over immediately).

The containment machine central computer control unit performs the following functions (or the like):
    accepting the control parameters entered by a human;
    coordinating the operation of the buoy sectional computer control unit for installation and de-installation;
    establishing and communicating the appropriate tension set points to the buoy sectional computer control units in a continuous, real-time manner;
    ensuring all buoy sectional computer control units work in concert for the control of the overall apparatus; and
    ensuring the whole apparatus of operating to set parameters and ensuring that there are corrective actions and/or alarms if values are outside of set ranges, by using various sensors on the containment machine.

Each buoy assembly includes:
    buoy sectional computer control;
    generator sets for power;
    motor, gear box, brake, drive train and winch assemblies complete with load cells and other sensors;
    ballast control pumps;
    keel controls; and
    an installation carriage to facilitate deployment.

The buoy sectional computer control unit each includes;
computer control unit, or RTU or C-WAVE (or the like) for computer control of all the assemblies, devices for communication with all the sensors, and for performance of control instructions (with redundancy);
Wireless Personal Area Network (WPAN) or Wired or Optical Personal Area Network (PAN) and the like for connection of all the pieces of the sectional system; and
communication devices connected to the containment machine central computer control unit (this would be wireless for main operation, perhaps with wired, tethered and set up for emergency operation).

Each buoy sectional computer control unit performs the following functions (or the like):
communicating with the containment machine central computer control unit, to send sensor and other data as required and receive instructions;
meeting the requirements to meet the "set points" issued by the containment machine central computer control unit;
communicating with its sensors;
operating winch control loops;
operating depth control loops;
operating buoy ballast controls;
performing installation state changes, including controlling of the installation carriage; and
performing monitoring functions to monitor the following:
water quality;
structural integrity; and
weather.

The barge machine includes a barge machine central computer control unit. The barge machine central computer control unit is located apart from the overall container machine central control unit on a ship, tug boat or the like, and includes:
one or more computer control unit, or RTU or C-WAVE or the like for computer control of all the barge assemblies,
communicating devices for communicating with all other Computer control unit, or RTU or C-WAVES or the like on the respective barge assemblies via Wireless Personal Area Network (WPAN or Wired or Optical Personal Area Network (PAN) and the like);
communicating devices with Internet-to-outside world by means of WIFI, cellular or the like;
communicating devices with the barge machine SCADA system;
apparatus for human machine interface. This is the main way that people interact with the machine, and it may be via the computer control unit, or RTU or C-WAVE system or the like, the barge machine SCADA system, or another computer hooked into the communication assembly central network; and
monitoring sensors, as required.

All physical pieces should have full redundancy and be operating in "hot" back-up mode. This means that they should be able to take over immediately in case of failure of any of the respective physical pieces.

The barge machine central computer control unit performs the following functions (or the like):
monitoring the operational status of all the barge assemblies—for example, if the barge assemblies are in the mode of collecting contaminants, the barge machine central computer control unit monitors the fill level of each barge assembly, the barge machine central computer control unit would effect the dispatching of tug boats and empty barge assemblies; and
acquiring data from respective barge machine sectional computer control units and communicating the acquired data appropriately to the outside world.

The barge machine sectional computer control unit aids in the installation and contaminant collection if needed. Each barge machine sectional computer control system (or the like) includes:
generator sets for power;
crane controls;
ballast controls;
pumps for collection of contaminant;
gas level monitoring equipment;
computer control unit, or RTU or C-WAVE or the like for computer control of all the respective barge machine components, communication with all the sensors, performance of control instructions (with redundancy) of the barge machine central computer control unit;
Wireless Personal Area Network (WPAN) for connection of all the pieces of the sectional system; and
communication devices operatively connected to the barge machine central computer control unit for barges (wireless for main operation, perhaps with wired or tethered, and set up for emergency operation).

Each barge machine sectional computer control unit controls all equipment on each of the respective barge assemblies.

The barge assembly is comprised of the following:
flat deck to hold the truss/curtain assemblies;
cranes to facilitate installation;
one or more barge machine sectional computer control unit, or RTU or C-WAVE or the like for computer control of barge machine components;
radios;
bladder ballast tank to permit sea water to replace oil for buoyancy in rough seas (possibly bladder with two compartments);
separators for first level processing;
pumps and skimming equipment to be integrated with the cranes;
control system for a barge machine SCADA system;
generator sets for power;
all explosion-proof wiring;
fire pumps equipment, and foam equipment etc.;
gas level monitoring equipment;
life safety equipment, and pods sea-survival equipment;
anchor system for the barge assembly;
first aid equipment; and;
a small propeller system to move the barge away from a containment machine in case of fire or other emergency.

The size of the barge assembly is determined by the truss assembly lengths. The ballasts tanks can be used to store siphoned oil and act as a capture vessel if needed. The chambers can hold up to 8000 barrels of oil. The stored oil would be offloaded to shuttle tankers to take the oil to shore for further processing.

Method of Installation

Generally, there are many active platforms for offshore oil drilling and capture in one area at a time; for example the Gulf of Mexico and the like. Multiple instances of the invention can be available and ready for deployment in areas of high activity in an event of leakage from any one of the active platforms. The containment barrier modules and the barges are meant to be maintained in a state of continuous operational readiness.

The containment barrier is fabricated as separate modular components and can be easily transported by plane, rail and/or barge. It is meant to be assembled when needed and can be mobilized to the site and be operational within days. To determine the optimum barrier shape and configuration for the intended location and the number of modules needed pre-planning and analysis, the following is required:
1. site survey and risk assessment;
2. marine conditions; and
3. deployment requirements: where the modules should be located (on barges or on shore) and waiting.

The site survey, risk assessment, marine conditions and deployment requirements dictates:
truss design and material specifications,
truss connection design,
buoyancy tank design, pressure specifications,
curtain assembly design (flexible, rigid etc.), size and material specifications,
cable specifications,
anchor design and specifications,
stiffener requirements, and
buoy assembly size.

The overall shape and number of modular components needed is determined by the size of a potential spill, depth of water, marine conditions and the like. The component architecture is easily assembled to create a barricade between the escaped oil and other pollutants and uncontaminated fresh or salt water.

Once the structure is assembled based on information from the site survey and marine conditions, measurements are made to keep the structure within its operating limits. This includes:
measuring the tension in the cables;
winch movement; and
buoy assembly level in the water.

The containment barrier is a tubular barrier which is not sealed; rather it is open at the top and bottom allowing the contaminant to flow to the surface in a controlled and contained manner. The circumference of the containment barrier is intended to be large so that large volumes of oil can be contained and removed by shuttle tankers stationed outside of the barrier ring. The shuttle tankers or capture vessels ship the oil to shore for further processing. However, covers can be employed in a non-sealing manner in the event of inclement weather.

Possible scenarios for getting the buoy assemblies in place:
using a tug boat, in which a chain of the buoy assemblies are assembled behind the tug boat and pulled to location;
determining the size and optimal shape of the circumference of the system required to limit current drag forces then determine the GPS location of each buoy assembly;
using GPS to position each buoy assembly and dropping the anchors of the respective buoy assemblies one at a time, using under sea cameras to verify proper seating;
getting communication system (buoy assembly SCADA) up and running;
using another tug boat to bring in the flat deck barge assemblies carrying the truss/curtain assemblies complete with curtains; or
attaching all barge assemblies and buoy assemblies, with the anchor for the respective buoy assemblies up, tow to sea in place for the proper geometry then start lowering the anchors and proceed to installation.

Each flat deck barge assembly has a number of small cranes (or the like) to lift the truss/curtain assemblies into place.

Each containment machine is composed of containment rings of truss assemblies and curtain assemblies connected together in a closed tube-like structure virtually positioned in a body of water over a containment-containing location. The following is a brief description of the deployment of the containment machine:

First or bottommost containment ring:
with the barges on the outside of the circle or the like shape, move the truss assembly into the inside of the circle (or other closed shape) of buoy assemblies;
shackle each truss assembly to its neighboring truss assembly to form a complete enclosure;
attach the truss assembly at the junction point of the two truss assembly ends to the lowering cable from the respective buoy assemblies into the body of water; and
when the containment assembly enclosure is totally secured to the cables, the containment machine central computer control unit will give instructions to the buoy sectional computer control units to lower the respective truss assemblies, unrolling the respective curtain assemblies to their full extension.

Second and subsequent rings:
with the barges on the outside of the containment machine enclosure, move the truss assembly into the inside of the buoy assembly;
shackle each truss assembly to its neighboring truss assembly to form a complete circle (although the word "circle" is used, it means a closed figure);
attach the truss assembly at the junction point of the two truss assembly ends to the lowering cable;
attach the top of the lower curtain to the next truss assembly;
when the circle is totally secured to the cables and to the appropriate previous curtain assembly, the control system will lower the truss assembly, unrolling the curtain assembly to its full extension while installers secure the sealing web material making each curtain assembly a closed structure;
when the last curtain assembly is to be installed, a better seal is required for in between the curtain assembly to absolutely have a closed containment assembly wall to retain the oil until skimmed and pumped into the appropriate tank onto the barges.

There are several shape configurations for the containment assembly including the following:
basic cylinder ("cylinder" means a regular shaped geometric figure such as a hexagon) with straight sides in an emergency situation is the fastest to deploy;
a shape to take into account stronger currents and to reduce drag forces; for example, it could be a pie shape with the pointed side facing into the current;
a shape for diverting any possible gas bubbles away from the drilling equipment, i.e., offset where the stem pipe will cross the sock structure to divert any bubbles which would come and affect the buoyancy of the rig or drilling ship or the like; and
a leaning structure leaning from the bottom to the top to place to containment away from the drill ship.

There are different methods to secure the structure at different levels, including the following:
employ a system of buoy assemblies and anchor them away from the containment assembly area with a guy wire attached at different levels; or
employ different buoy assemblies in a closed or open shape at different levels, to redirect flows and lessening the forces on the main containment machine.

BRIEF DESCRIPTION OF THE DRAWINGS

A more complete understanding of the present invention, description, advantages, objects and methods thereof may be acquired by referring to the following description taken in conjunction with the accompanying drawings, in which reference numbers indicate like features.

It is to be noted, however, that the appended drawings illustrate only typical embodiments of this invention and methods and are therefore not to be considered limiting of its scope. The invention may admit to other equally effective embodiments.

FIG. 12 is a schematic perspective view of a rigid metal curtain forming a possible part of the preferred embodiment of the invention.

FIG. 13 is a schematic side view of a rigid curtain forming a possible part of the preferred embodiment of the invention.

FIG. 14 is a detailed view taken in the direction A-A in FIG. 13.

FIG. 21 is a schematic perspective view of curtain assemblies and truss assemblies suspended from three buoy assemblies according to a preferred embodiment of the invention.

FIG. 22 is a schematic perspective view of curtain assemblies and truss assemblies suspended from three buoy assemblies in detail as shown in item A in FIG. 21.

FIG. 23 is a schematic perspective view of curtain assemblies and truss assemblies suspended from three buoy assemblies in detail as shown in item B in FIG. 21.

FIG. 24 is a schematic perspective view of two curtain assemblies connected together according to the preferred embodiment of the invention.

FIG. 25 is a schematic perspective view of the detail shown in item A of FIG. 24.

FIG. 30 is a schematic perspective view of a truss connection assembly according to the preferred embodiment of the invention.

FIG. 31 is a schematic side view of the truss connection assembly according to the preferred embodiment of the invention.

FIG. 32 is a schematic front view of the truss connection assembly according to the preferred embodiment of the invention.

DETAILED DESCRIPTION OF THE PREFERRED EMBODIMENT

Figure 1:
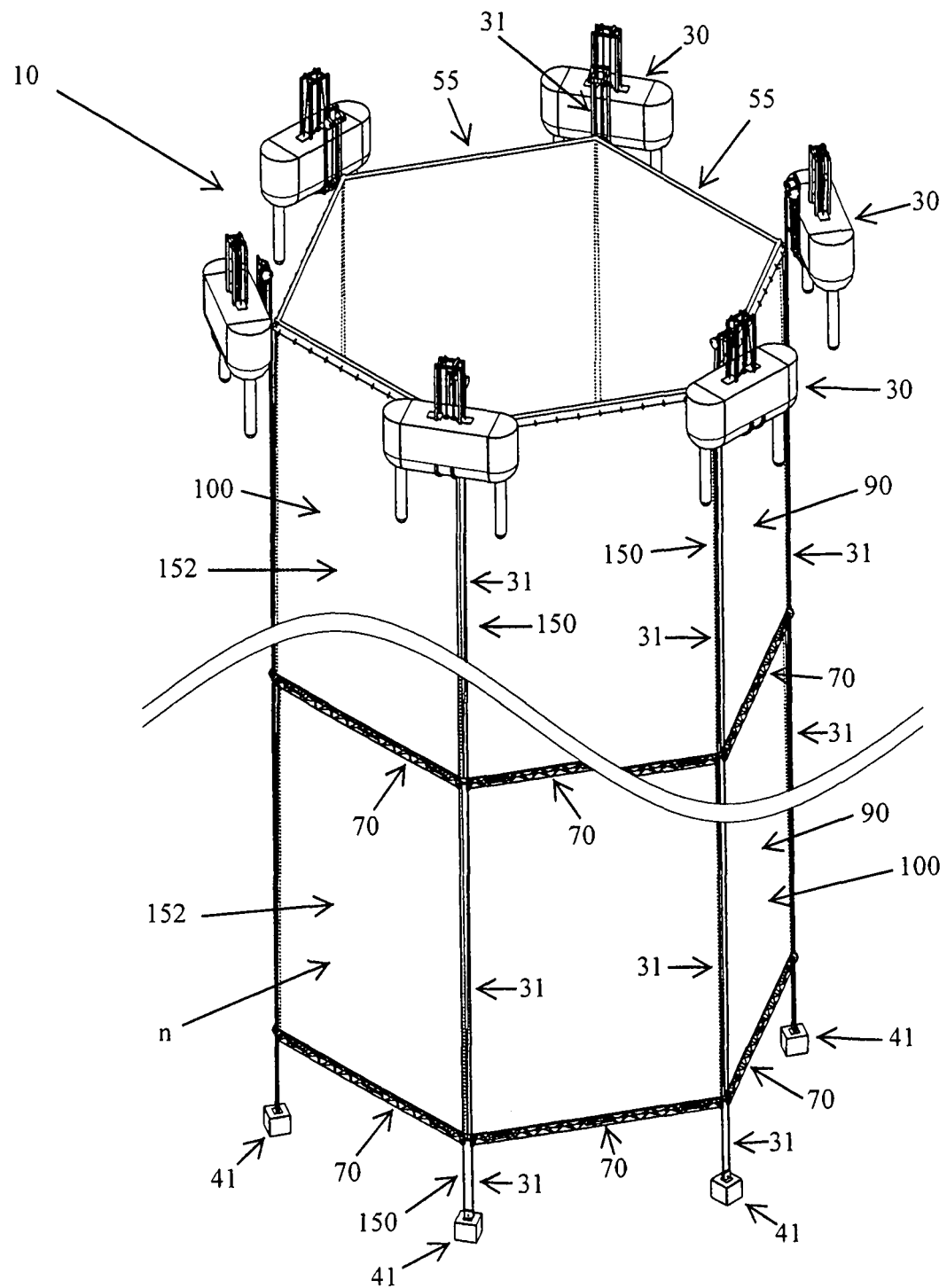
FIG. 1 is a schematic perspective view of the preferred embodiment of the invention in its final erected state in a body of water.

FIG. 1 shows a series of buoy assemblies 30 from which are suspended a set of truss assemblies 70 and a set of curtain assemblies 90 forming part of a containment machine 10. Although the term "truss" is used herein, which generally means a structural framework, especially one arranged in triangles, used to support other items and is preferred in the structure being described herein, other elongated support structures are also included in the term "truss" as used herein. A set of barges, or the like (hereinafter referred to as "barges") 50 (FIGS. 2, 26, 27) have been omitted in FIG. 1 to more clearly show buoy assemblies 30 floating on the water surface. Buoy assemblies 30 are positioned above the ends of each respective truss assemblies 70, forming a hexagon around a contaminant source. Truss/curtain assemblies 70, 90, designated hereinafter by numeral 100, are attached to cables 31 that extend from winches (discussed below) through pulleys (also discussed below) located in buoy assemblies 30 and terminate at anchors 41 which sit on the ocean floor. Respective cables 31 are connected together to form a set of cables 150. In this embodiment, there are two concentric and coaxial series of truss assemblies 70 and curtain assemblies 90 attached together and connected to set of cables 150. Multiple containment rings 152 ("rings" means any closed configuration, not necessarily circular) (1 to n) are formed at each level of a closed set of truss/curtain assemblies 100, and submerged. Each set of attached containment rings 152 forms a tubular barrier 55 ("tubular" means any closed figure which need not have a circular cross section) which is not sealed; rather it is open at the top and bottom allowing the contaminant to flow to the surface in a controlled and contained manner. There is enough space between the sea bed floor and the bottom curtain for pressure equalization.

Figure 2:
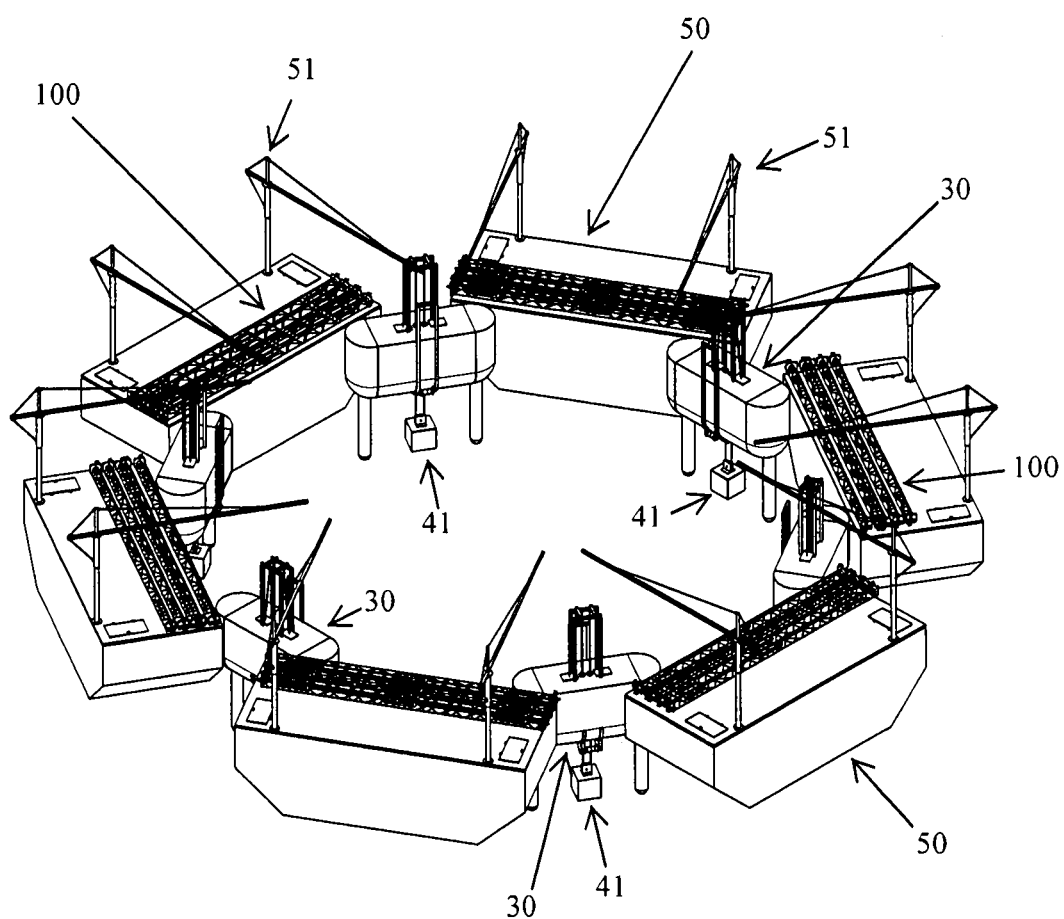
FIG. 2 is a schematic perspective view of the preferred embodiment of the invention showing barges with components of other parts of the invention, in position to be unloaded in a body of water.

Referring to FIG. 2, truss/curtain assemblies 100 have been loaded onto the barges 50. Tug boats have towed buoy assemblies 30 or barges 50 into position in the shape and circumference (or peripheral length) to contain the contaminant. The position of buoy assemblies 30, determined by GPS, is based on site specific marine calculations to minimize current forces. A set of cranes 51 are in the ready position. Buoy assemblies 30, with a set of anchors 41 in the transport position ready to be dropped, are attached to barge assemblies 50 with cranes 51.

Figure 3:
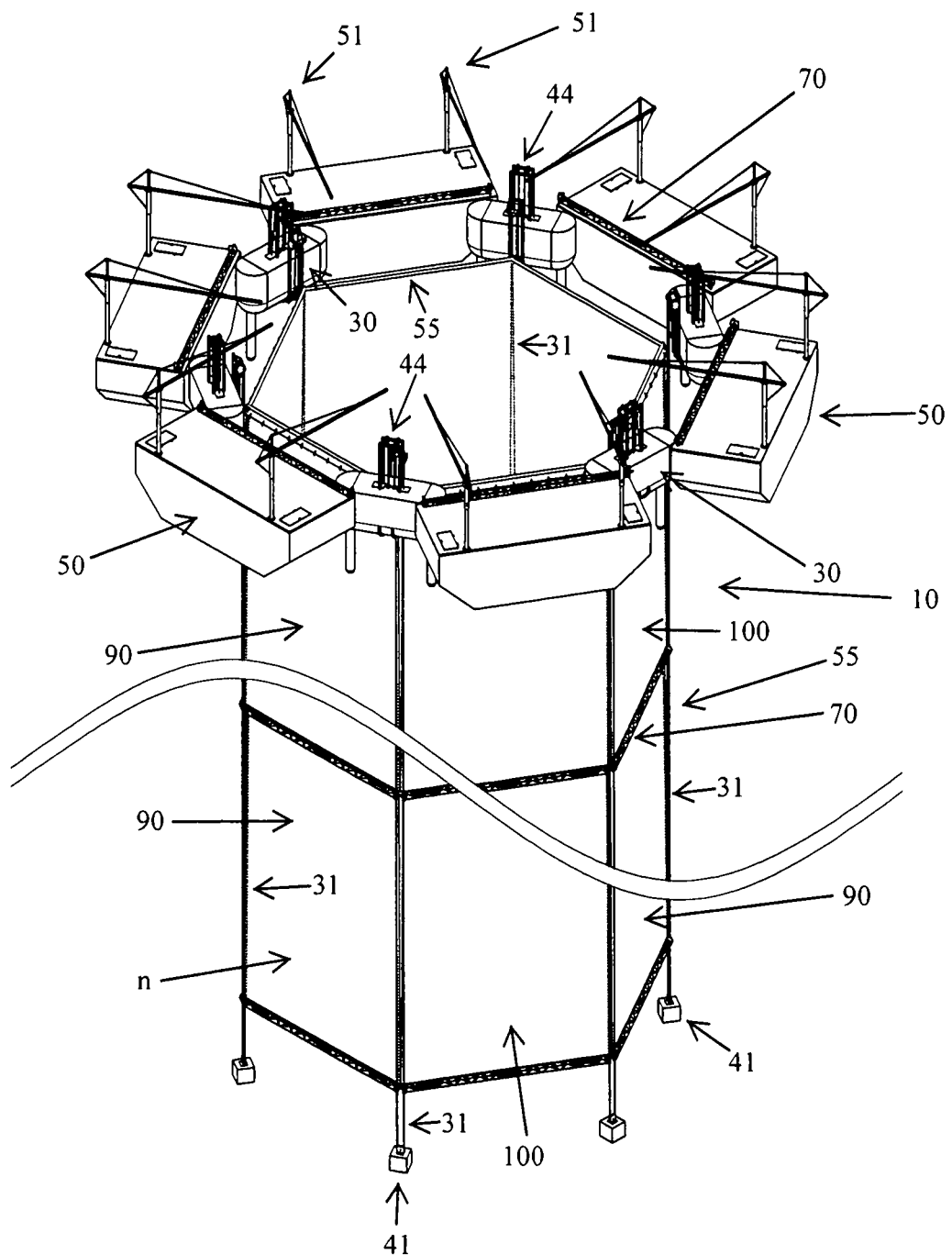
FIG. 3 is a schematic perspective view of the preferred embodiment of the invention with components of the invention being lowered into a body of water.

FIG. 3 shows the erection of truss assemblies 70 and curtain assemblies 90. Truss assemblies 70 have been loaded onto barges 50. The tug boats have towed buoy assemblies 30 and barges 50 into position in the shape and circumference to contain the contaminant. Cranes 51 are shown in the ready position. Buoy assemblies 30 are attached respectively to the barges 50. Buoy assemblies 30 are positioned above the ends of each truss assembly 70, forming a hexagon around the contaminant source. The truss/curtain assemblies 70, 90 are attached to cables 31 that extend from a set of winches 43 (discussed below) located in respective buoy assemblies 30 through a set of pulleys 44 (discussed below) and terminate at anchors 41 which sit on the ocean floor. In this embodiment, there are two concentric series of truss assemblies 70 and curtain assemblies 90 attached together and connected to the cables 31. The multiple (1-n) containment rings 152 are submerged. Tubular barrier 55 is not sealed; rather, it is open at the top and bottom allowing the contaminant to flow to the surface in a controlled and contained manner. There is enough space between the sea bed floor and the bottom curtain assembly 90 for pressure equalization. The number of containment rings 152 is determined by depth and curtain specifications, and is generally many more than two.

Figure 4:
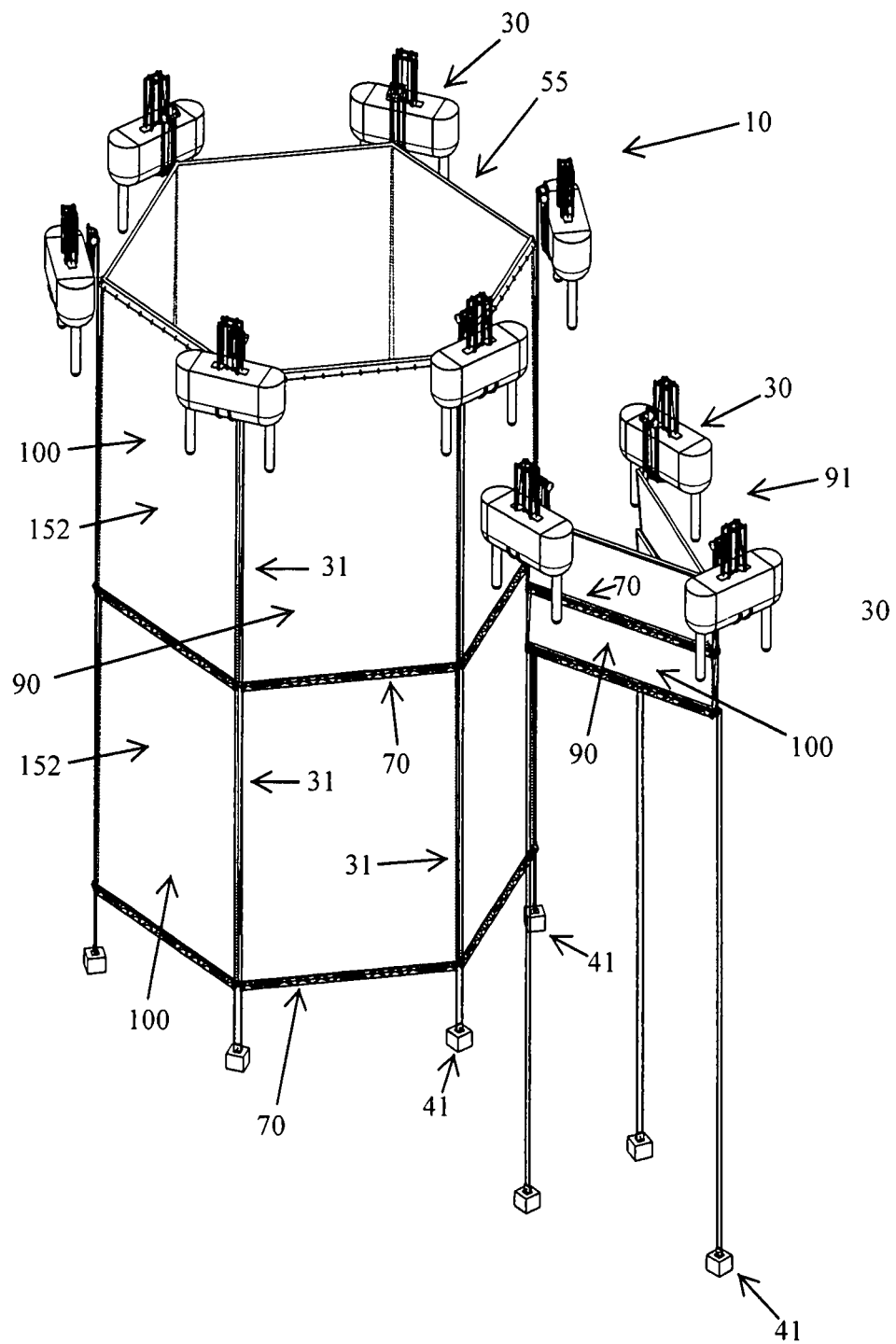
FIG. 4 is a schematic perspective view of the preferred embodiment of the invention showing an arrangement for directing/deflecting water current.

FIG. 4 shows the preferred embodiment arranged to compensate for water current. In this case, the shape of tubular barrier 55 is hexagonal with concentric curtain/truss assemblies 100 forming containment rings 152 extending to near the water body floor. An attached unit has been added to direct/deflect current. A deflection unit 91 is comprised of three buoy assemblies 30, each having anchor 41, and rigid curtain/truss assemblies 100 in a V shape.

Figure 5:
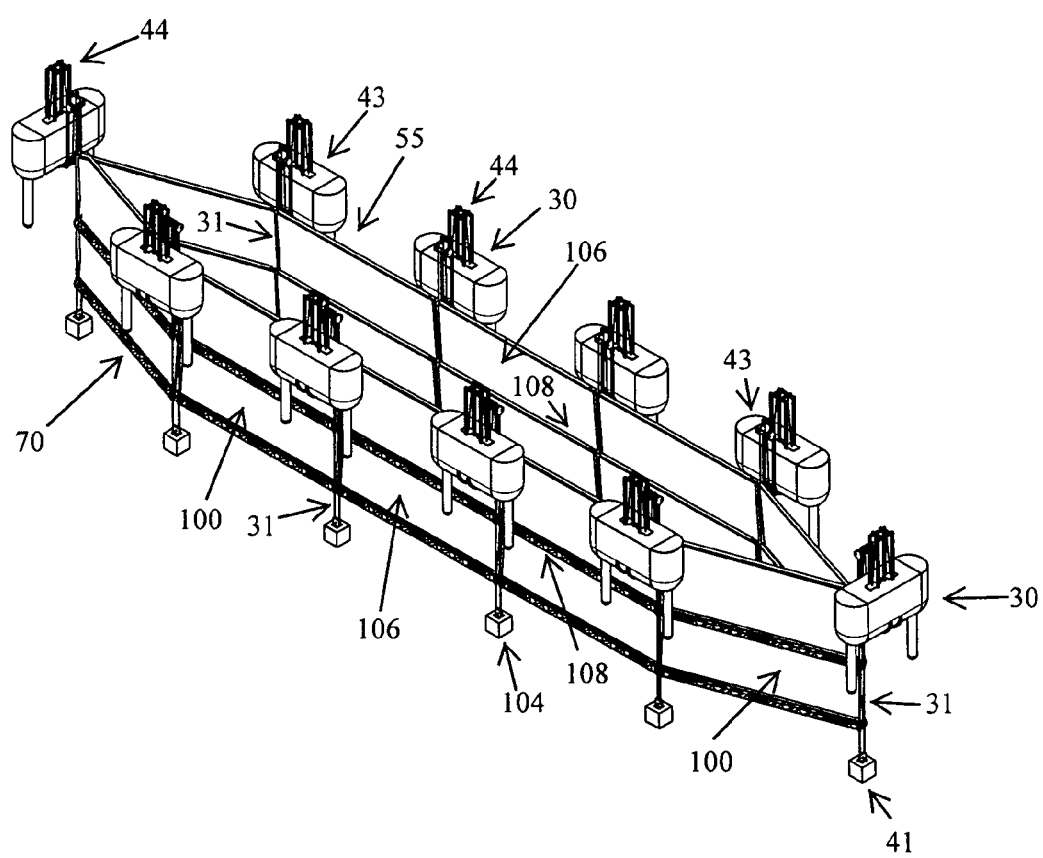
FIG. 5 is a schematic perspective view of the preferred embodiment of the invention showing an arrangement for compensating for water current.

FIG. 5 shows the preferred embodiment of the present invention also compensating for water current. In this case, the shape of determined by marine conditions is long, narrow and pointed at both ends positioned parallel to water current. Each curtain/truss assembly 100 includes curtains 106 made of steel plates. Buoyant material 108 is located between the plates. Buoy assemblies 30 are positioned above the ends of each truss assembly 70. The truss/curtain assemblies 100 are attached to cables 31 that extend from winches 43 (discussed below) through pulleys 44 (discussed below) located in the buoy assemblies 30 and terminate at anchors 41 which sit on the ocean floor.

Figure 6:
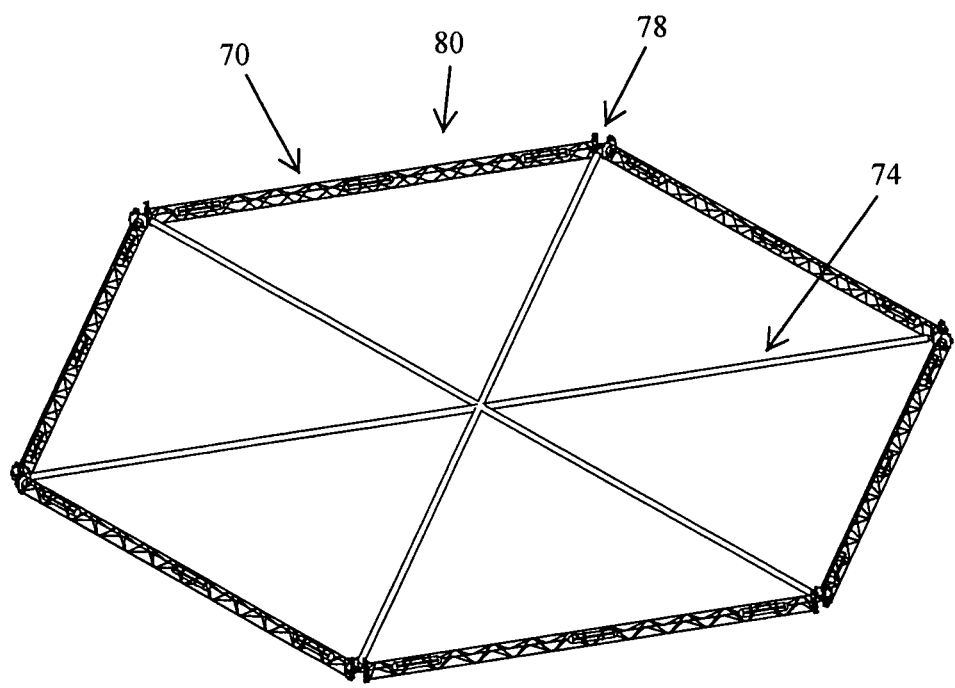
FIG. 6 is a schematic isometric view of interconnected rigid trusses according to the preferred embodiment of the invention with stiffeners for resisting lateral forces.

FIG. 6 depicts a rigid truss configuration 80 having truss assemblies 70 connected together by rigid truss connectors 78 with a set of stiffeners 74 designed to resist lateral forces like current, wind and the like.

Figure 7:
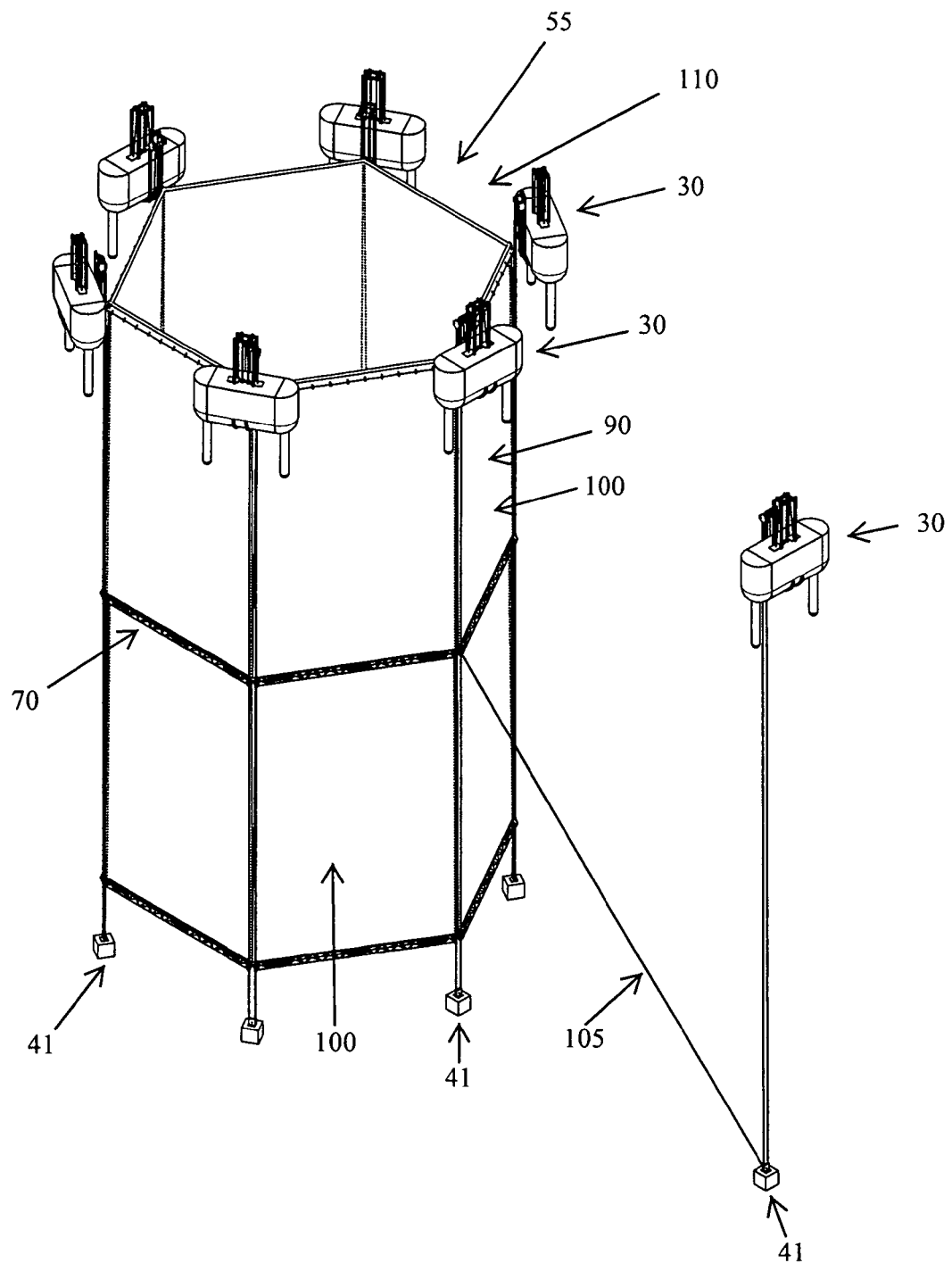
FIG. 7 is a schematic perspective view of the preferred embodiment of the invention with a buoy assembly and anchor positioned to the side of the barricade formed by the respective buoy assemblies and the connected curtain assemblies and truss assemblies.

FIG. 7 shows the preferred embodiment of the present invention having a buoy assembly 30 located off to the side of truss/curtain assemblies 100. Cable 105 is connected to anchor 41 of side-located buoy assembly 30 and to an intersection of truss assemblies 70. The tension of cable 105 can be controlled. Cable 105 is used to direct the containment assembly 10 to a desired position.

Figure 8:
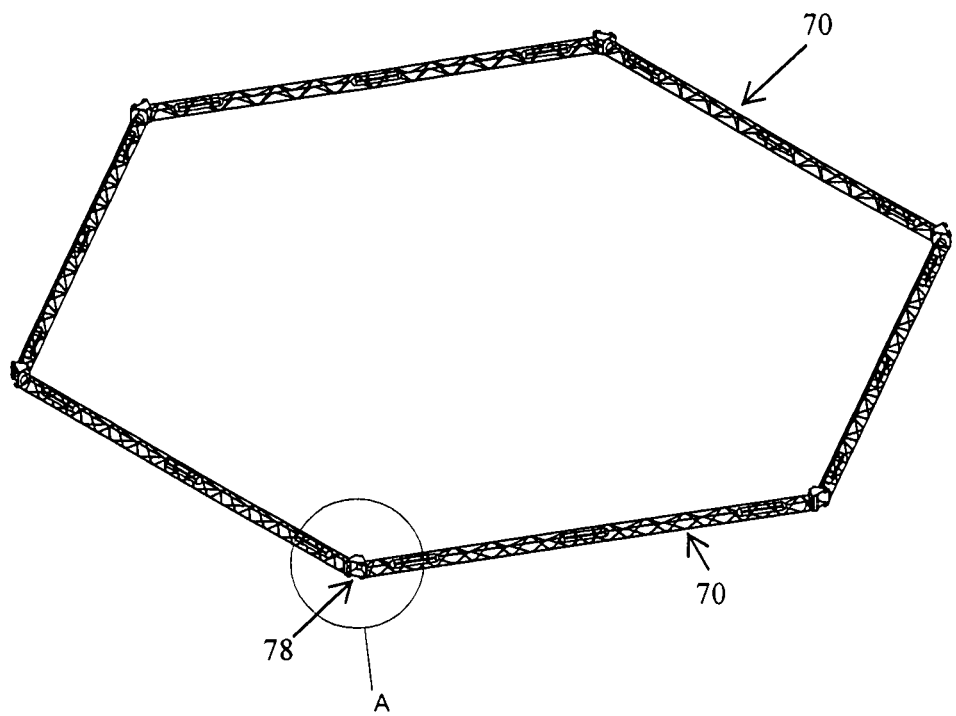
FIG. 8 is a schematic isometric view of the rigid truss configuration according to the preferred embodiment of the invention.

FIG. 8 illustrates a rigid truss assembly configuration composed of interconnected truss assemblies 70. The shape is determined by marine conditions such as water depth at the location of the truss, water currents, water quality and water conditions.

Figure 9:
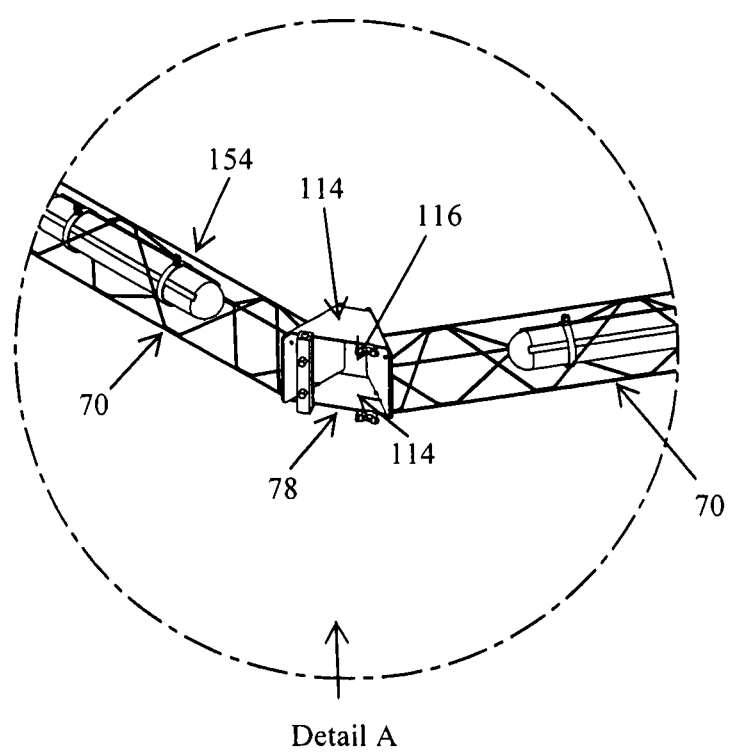
FIG. 9 is a schematic perspective view of the rigid truss connector assembly used to join two truss assemblies according to the preferred embodiment of the invention.

FIG. 9 is a detail of the rigid truss connector 78 used to join two truss assemblies 70. Other connectors can be used such as gusset plates and the like. Rigid truss connector 78 is a truncated pyramid-like structure having four inclined side faces 114, each narrow face having narrow surfaces connected to a rectangular end plate 116. Connector 78 is made from a non-corrosive metal.

Figure 10:
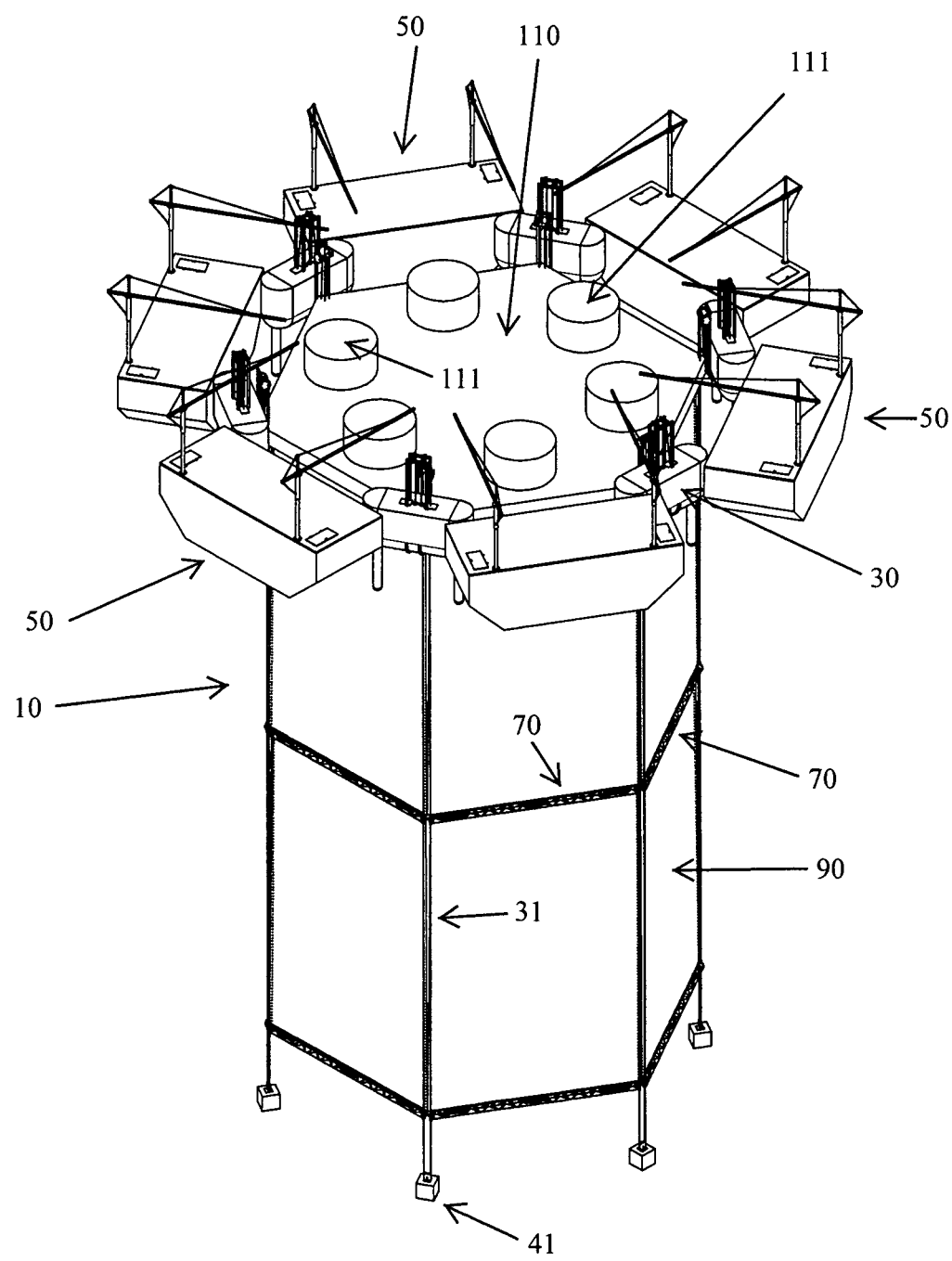
FIG. 10 is a schematic perspective view of the preferred embodiment of the invention having a sealing cover with gas scrubbers installed thereon.

FIG. 10 depicts the preferred embodiment of the invention with a sealing covering 110 extending over the top of containment machine 10, and having mounted thereon gas scrubbers 111. In hurricane conditions, barges 50 would need to be brought back to the containment site. With a sealing cover 110 over the exposed contaminant, the entire structure of the containment machine 10 and attached barges 50 could be lowered under the water a safe distance. The contaminant could be pumped from containment machine 10 to the likewise submerged barges 50 until the hurricane or the like has passed. For safety, gas scrubbers 111 would also need to be part of the cover 110 with a means to vent safely to the surface.

Figure 11:
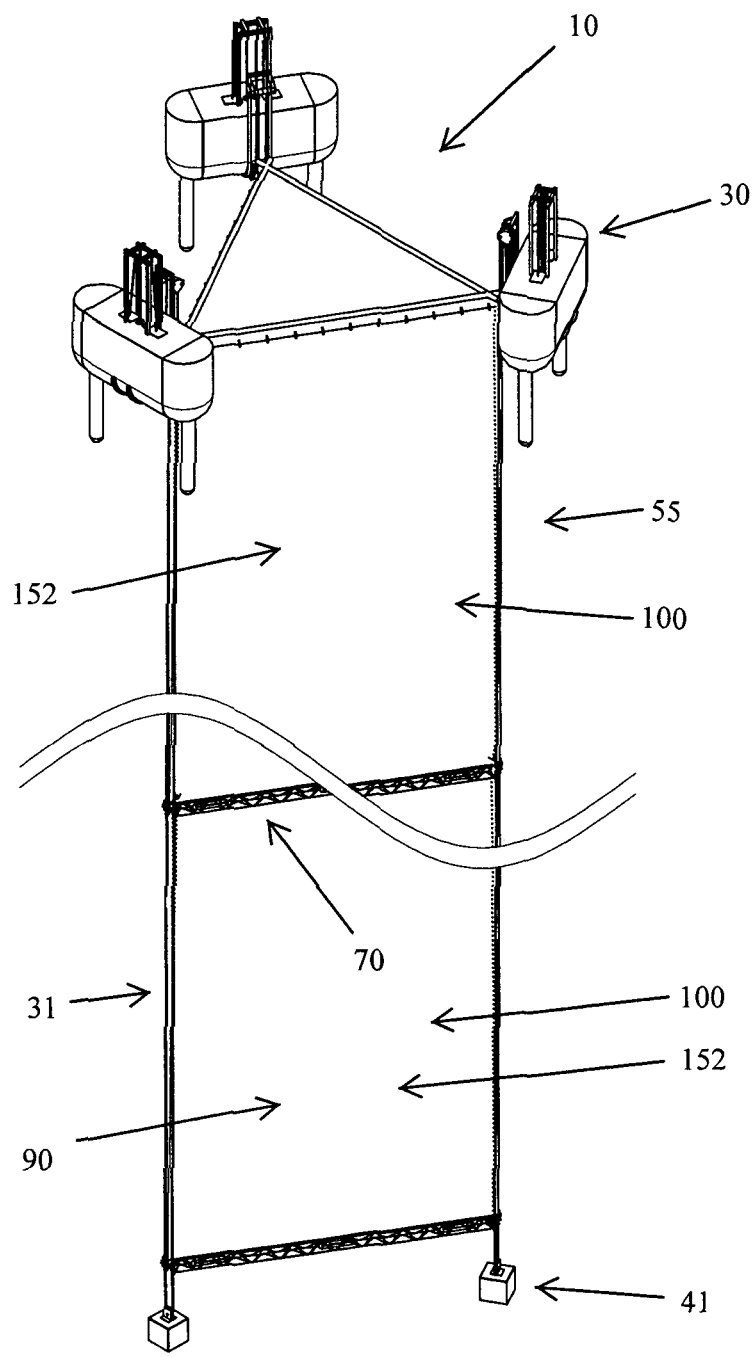
FIG. 11 is a schematic perspective view of the preferred embodiment of the invention with the barricade whose cross section is in the shape of a triangle.

FIG. 11 shows the preferred embodiment of the present invention where the containment machine 10 has the shape of a triangle. This shape was utilized due to the marine conditions like those noted above.

FIG. 12 illustrates a rigid metal curtain assembly 102. It includes curtain assembly 102 and a buoyancy material 116.

FIG. 13 is an isometric view of the rigid curtain assembly 102, also showing buoyancy material 116.

FIG. 14 is a detail of rigid metal curtain assembly 102 showing buoyancy material 116 located between the steel plates and a buoyancy band 118 along the top of the curtain assembly 102.

Figure 15:
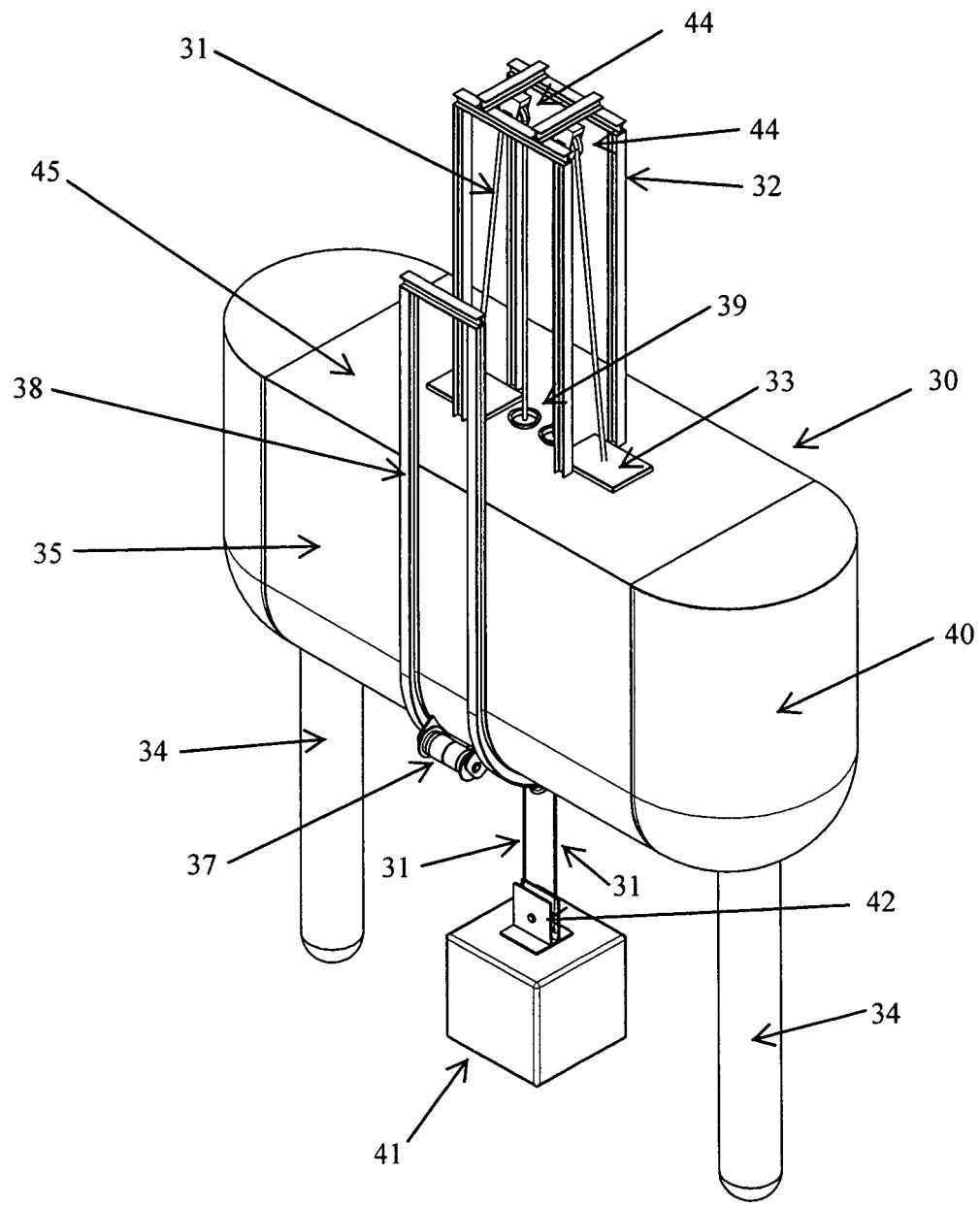
FIG. 15 is a schematic perspective view of a buoy assembly according to the preferred embodiment of the invention.

FIG. 15 is a view of a buoy assembly 30, external view of the cables 31, a set of two keels 34 and anchor weight 41. Two keels 34 project from the bottom of the buoy 30 for stability. Buoy assemblies 30 are towed into position and float upright in situ. The winches 43 and electronic controls (not shown) are located inside the buoy hull 35. The cables 31 are attached to anchor weight 41 at a set of anchor pulleys 42, cable 31 being threaded up through the bottom of the buoy assembly 30 through a pair of cable guide pipes 39, wound around pulleys 44, then threaded down through a pair of water seals 33 at the top of buoy assembly 30, and threaded onto a pair of winches 43A and 43B. Seals 33 are disposed at the top so that water cannot enter in the buoy assembly chamber. The cables 31 are externalized in this way so that truss assemblies 70 can be attached manually during the loading process without people entering the water. During installation and de-installation, an installation trolley system takes cable 31 from the bottom of the buoy assembly 30 and lifts it to a buoy assembly deck 45, for manual attachment of truss assembly 70 to cable 31. Winch 43 is used to pull in (wind up), let out (wind out) or to otherwise adjust the tension of cable 31.

Figure 16:
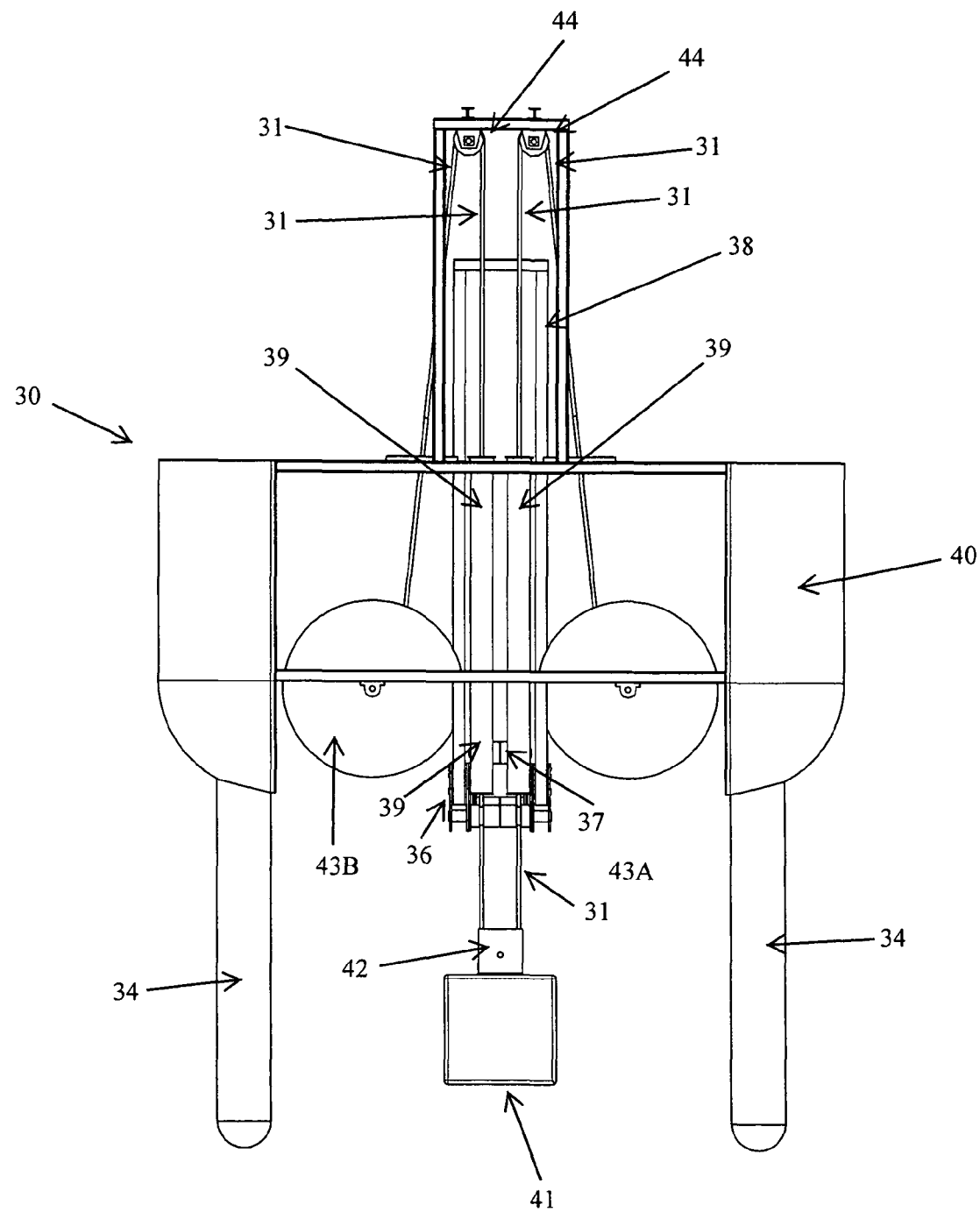
FIG. 16 is a schematic front view of the buoy assembly shown in FIG. 15, with the front plate removed to show the interior of the buoy assembly.

FIG. 16 illustrates buoy assembly 30, an external view of cables 31 and keels 34. The front face has been removed to expose winches 43 located inside buoy assembly 30.

Figure 17:
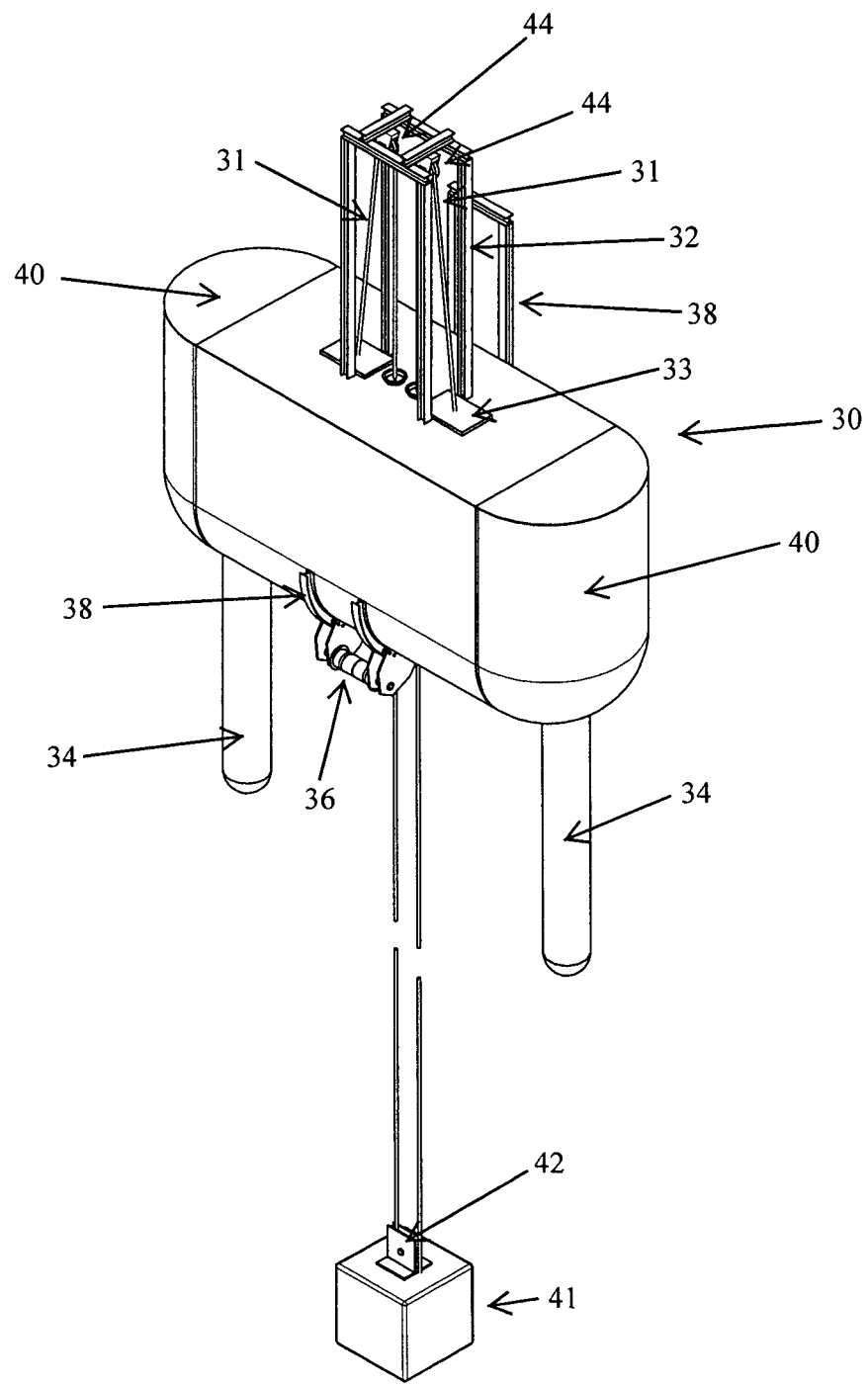
FIG. 17 is a schematic isometric view of the buoy assembly according to the preferred embodiment of the invention with an anchor structure fully extended.

FIG. 17 also shows buoy assembly 30, external view of cables 31, keels 34 and anchor weight 41 fully extended. Buoy assembly 30 includes a cable trolley 36 discussed below.

Figure 18:
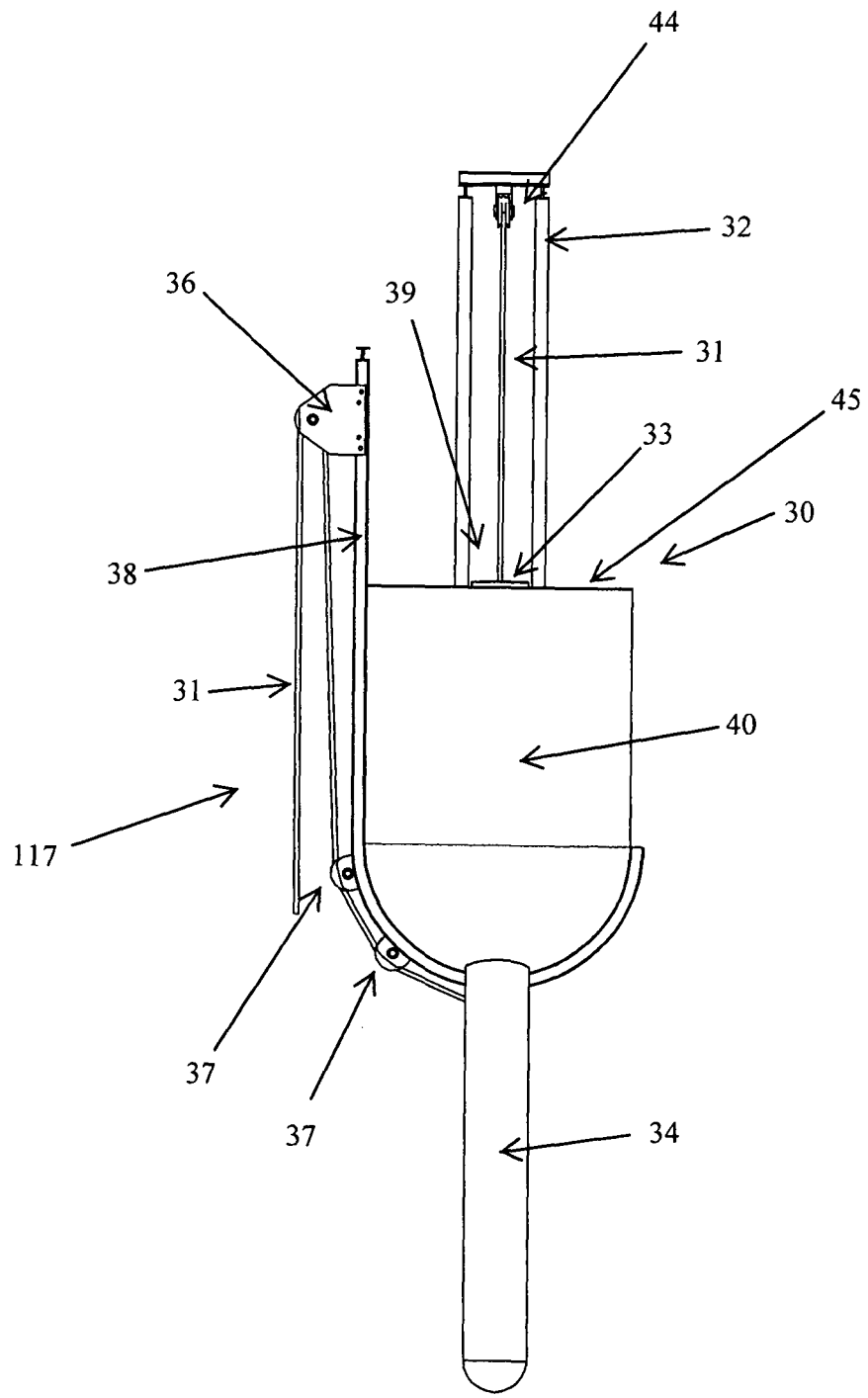
FIG. 18 is a schematic side view of the buoy assembly illustrating the installment carriage according to the preferred embodiment of the invention.

FIG. 18 depicts the side view of buoy assembly 30, showing the detail of an installation carriage 117 comprising a trolley carriage 38, rollers 37 to keep cables 31 away from both buoy assembly 30 and trolley carriage 38, and cable trolley 36. Keel 34 projects from the bottom of buoy assembly 30 for stability. Cables 31 extend from winches 43 inside buoy assembly 30 through water seals 33, up around pulleys 44, through cable guide pipe 39, to the bottom of buoy assembly 30, where cable trolley 38 in its lowered position catches cable 31 and lifts it along trolley carriage 30 over rollers 37, to deck level 45 of buoy assembly 30. Cable trolley 36 pulls cable 31 up along trolley carriage 38 located on the front so that the cable 31 is accessible during erection for curtain assembly 90 attachment and removal.

Figure 19:
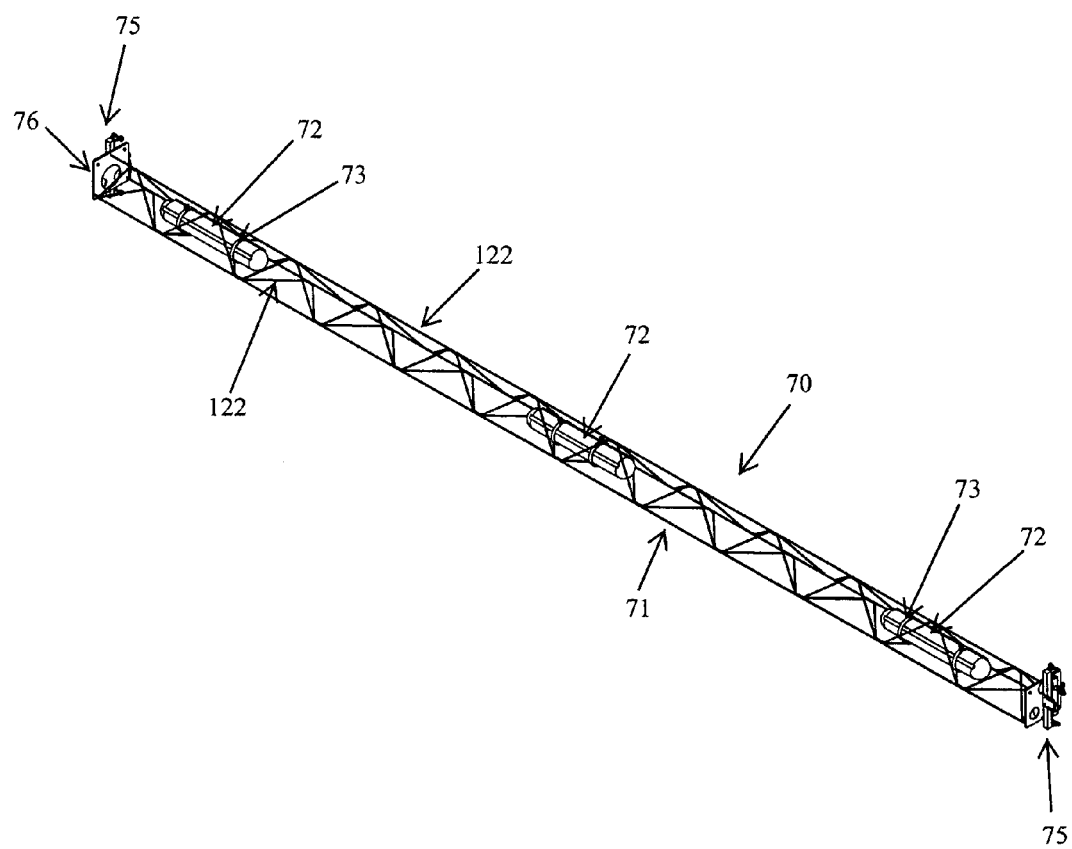
FIG. 19 is a schematic perspective view of the truss assembly according to the preferred embodiment of the invention.

FIG. 19 illustrates one length of truss assembly 70, a set of three buoyancy tanks 72 and truss connection assembly 75. The number, material and configuration of tanks 72 and truss assembly geometry will vary with truss length, depth, material and the like. Truss assembly 70 is preferably a grid of strong corrosion-resistant steel alloy composed of interconnected struts 122 with appropriate connections and braces 73 for holding tanks 72.

Figure 20:
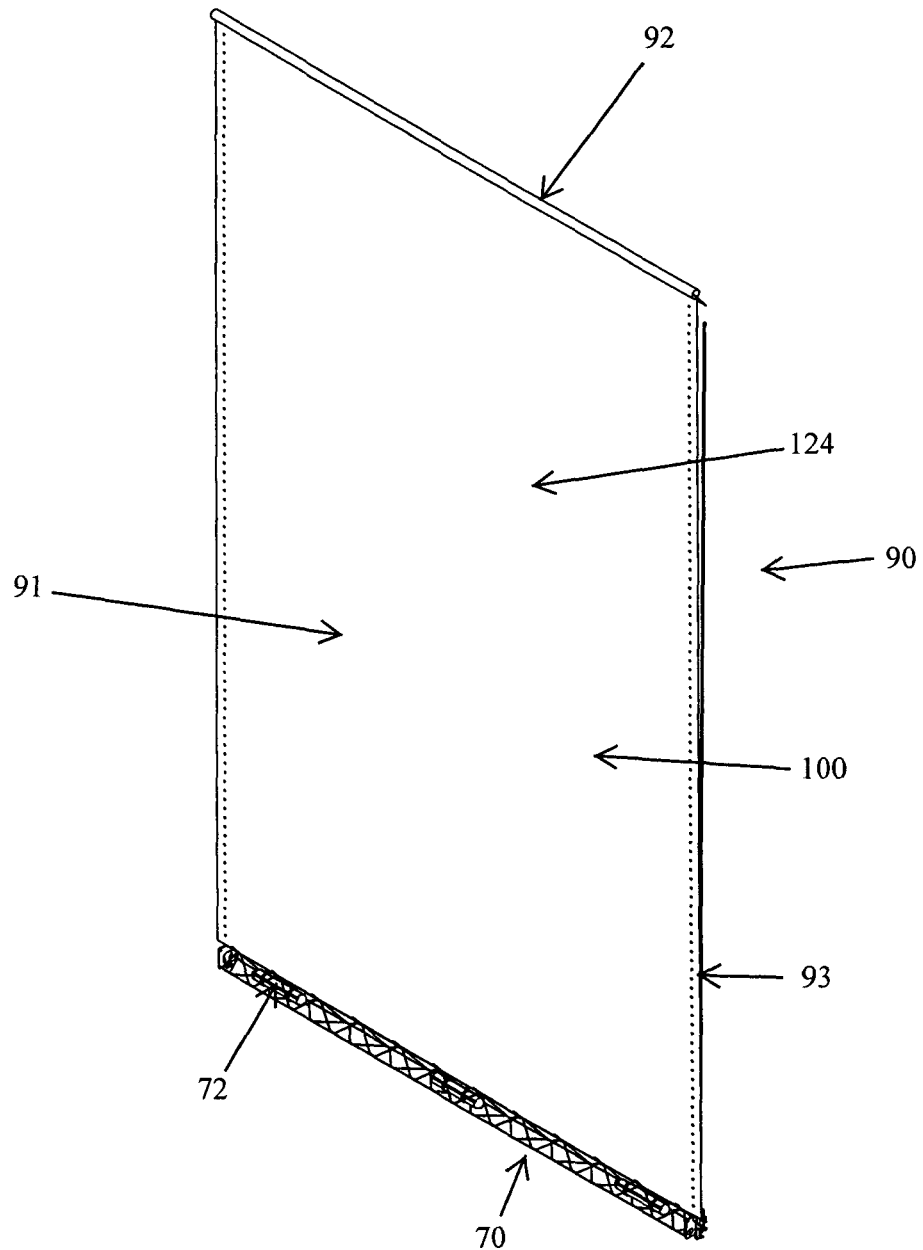
FIG. 20 is a schematic perspective view of a curtain assembly attached to a truss assembly according to a preferred embodiment of the invention.

FIG. 20 shows one panel of the curtain assembly 90 attached to truss assembly 70 at the bottom, a set of side fasteners 93 and a buoyancy band and band flap 92 at the top. Buoyancy curtain band and band flap 92 and buoyancy tanks 72 attached to truss assembly 70 produce a weightless assembly in water. Curtain assembly 90 can be made of two sheets of steel or the like that sandwich buoyancy material 116, a PVC-coated polyester fabric 124 and the like. The material is chosen based on the marine forces and conditions of the site.

FIG. 21 is a perspective view of the buoy assemblies 30, attached curtain assemblies 90 and anchor weights 41 extended to their full length. Truss assemblies 70 can be seen and the end of each curtain assembly 90. The number of curtain assemblies 90 is dictated by the water depth and circumference of the closed area.

FIG. 22 is a detailed view of truss/curtain assemblies 100 and cable 31 attachment. Truss assemblies 70 are fastened to cables 31 and cables 31 are in constant tension anchored on the sea bed floor.

FIG. 23 is a back view of the detail shown in FIG. 22 of truss assembly 70, truss connection assembly 75 and truss attachment to both its curtain assembly 90 (top curtain) and a flap 94 of the lower curtain assembly 90. Buoyancy curtain band and band flap 92 and flap 94 are part of lower curtain assemblies 90. Four curtain assemblies 90 are attached to cables 31 and supported by three buoy assemblies 30.

FIG. 24 illustrates curtains forming part of curtain assembly 91, a top buoyancy band side 96 and bottom fasteners 95.

FIG. 25 is a detailed view of curtain assembly 90 having a bottom fastener 95 and a side joining curtain fastener/splicer 97. Metal loops 125 are attached to splicers 126 and a rope 178 is threaded through loop 125. This is only one embodiment of the curtain side attachment and therefore not to be considered limiting of its scope.

Figure 26:
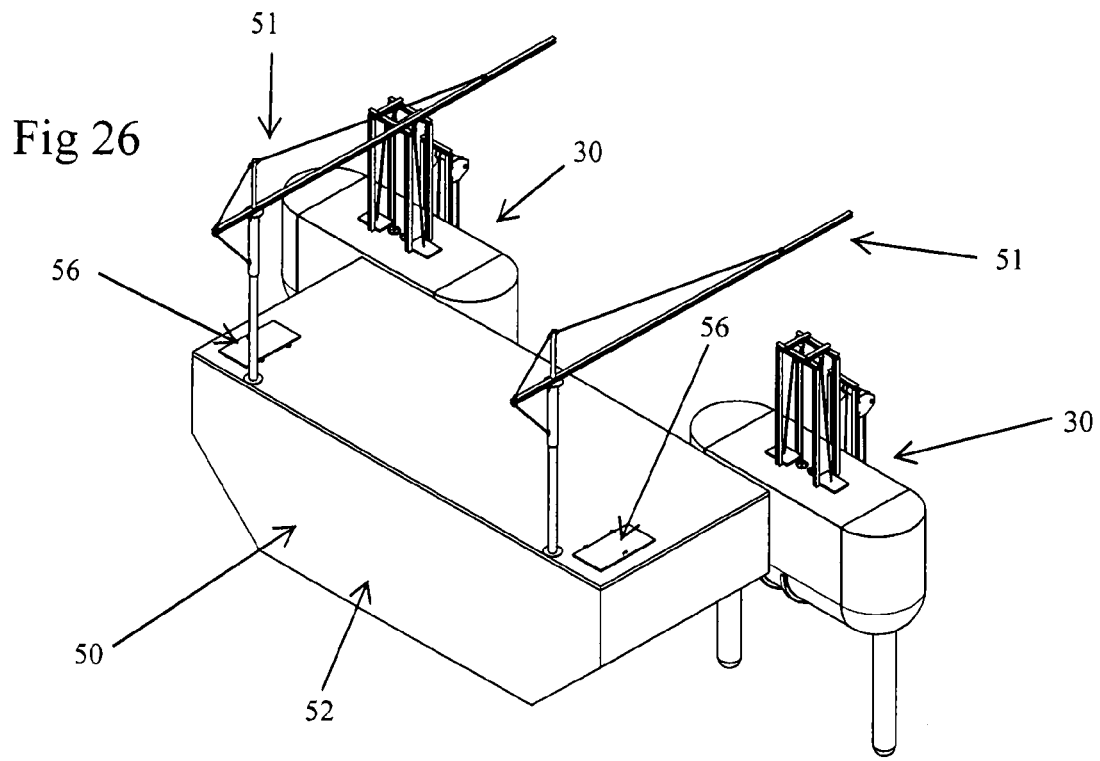
FIG. 26 is a schematic perspective view of a barge carrying cranes and two buoy assemblies according to the preferred embodiment of the invention.

FIG. 26 depicts barge 50, cranes 51 and two buoy assemblies 30 of the in-place and ready position for unloading and erection. Cranes 51 are extended and buoy assemblies 30 are fastened to the barges 50.

Figure 27:
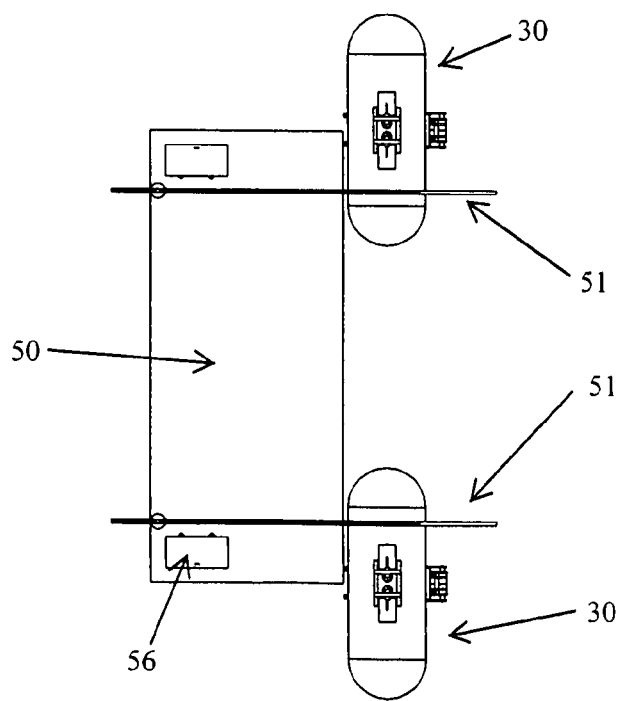
FIG. 27 is a plan view of the apparatus shown in FIG. 26.

FIG. 27 shows the top of the barge 50, cranes 51 and two buoy assemblies 30 of the in-place and ready position for unloading and erection. Cranes 51 are extended and buoy assemblies 30 are fastened to the barge 50.

Figure 28:
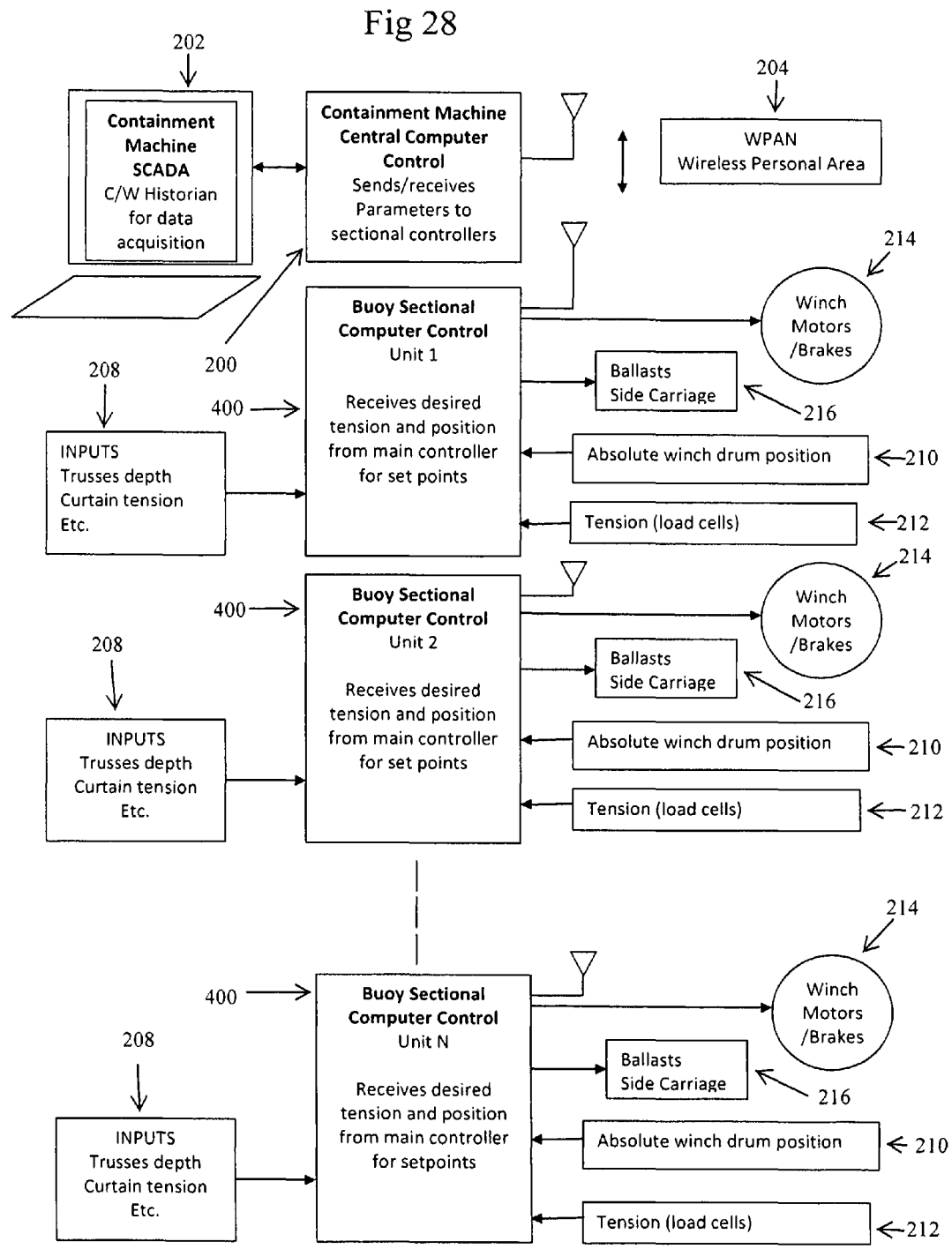
FIG. 28 is a flow diagram of the electronic containment machine central computer control unit according to the preferred embodiment of the invention.

FIG. 28 is a flow diagram of the control scheme for containment machine central computer control unit for containment machine 10. The base control scheme of the apparatus has a containment machine central computer control unit 200, a containment machine SCADA historian unit 202, a plurality of wireless communications systems 204 with a plurality of units and a plurality of buoy sectional computer control units 400.

With reference to FIG. 28, a containment machine central computer control unit 200 is operatively connected to a containment machine SCADA historian unit 202 with which containment machine central computer control unit 200 is in electronic correspondence to continuously update data in unit 200. Containment machine central computer control unit 200 is in operative connection with Wireless Personal Area Network (WPAN) 204 for exchanging pertinent information. Unit 200 is also in operative connection with a series of buoy sectional computer control units 400. Each of units 400 is located in a buoy assembly 30 in a containment machine 10. Each buoy sectional computer control unit 400 receives input signals from sensors indicated at numerals 208 from components of each of the respective buoy assemblies 30 indicative of such figures as the depth of the respective truss assemblies 70, curtain assemblies 90 and truss/curtain assemblies 100 in the respective containment rings 152, as well as with sensors 210 for absolute winch drum positions and sensors or load cells 212 associated with the respective cables 31. The foregoing signals received by containment machine central computer control unit 200 from buoy sectional computer control unit 400 result in containment machine central computer control unit 200 transmitting set points for the various values measured by buoy sectional computer control units 400. Historian unit 202 sends signals to containment machine central computer control unit 200, which in turn continuously causes the respective buoy sectional computer control units 206 to make the necessary adjustments to ballasts 40 by means of signals to ballasts side winch motors/brakes 214 and ballasts side carriage 216.

Figure 29:
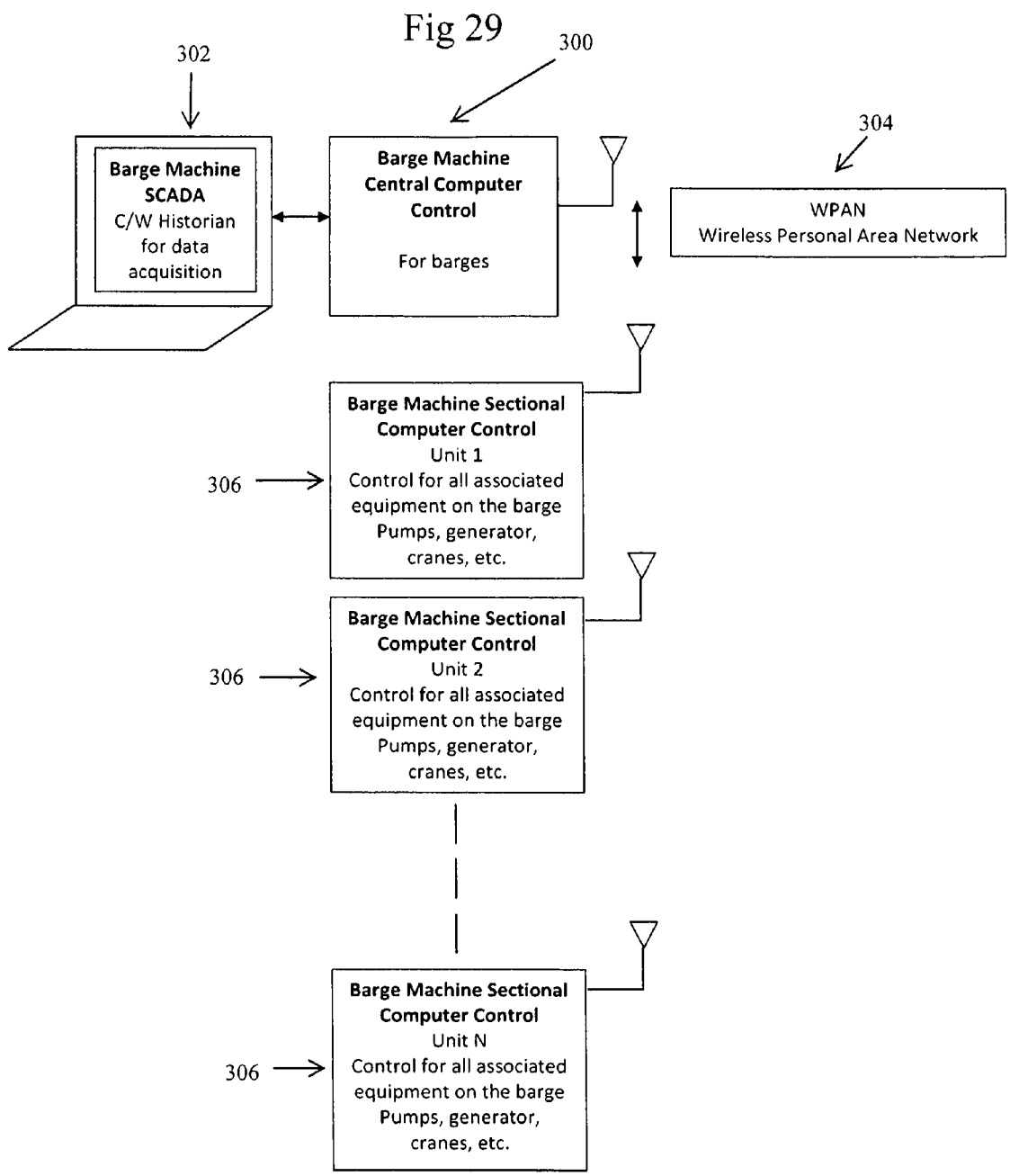
FIG. 29 is a flow diagram of the electronic barge machine central computer control unit according to the preferred embodiment of the invention.

FIG. 29 is a diagram of the control scheme for the barge machine. The base control scheme of the apparatus consists of: one barge machine central computer control unit 300, one barge machine SCADA unit 302, a plurality of wireless communications systems 304 with a plurality of units and a plurality of barge machine sectional computer control units 306.

Barge machine central computer control unit 300 is in constant communication with barge machine SCADA historian unit 302 for continuously maintaining proper data in unit 300. Barge machine central computer control unit 300 is also in operative contact with WPAN 304 for transmitting and receiving pertinent information. Each barge machine sectional control units 306 are in contact with sensors with the various equipment located on each of the barges. Signals from the latter equipment are transmitted to barge machine sectional computer control units 306 which exchange signals with barge machine central computer control unit 300. The latter unit 300 continuously establishes set points for the respective barge equipment, transmits those set points to the respective barge machine sectional computer control units 306, which in turn transmits control signals to the component equipment on the respective barges.

FIG. 30 illustrates a group of truss connection assemblies 75 showing a cable clamp 79 securely attaching respective truss assembly connection assemblies to respective cables 31.

FIG. 31 shows the side of the truss connection assembly 75 showing cable clamp 79 attached to right cable 31 and left cable 31 threaded through a cable guide 80, and the attaching of the two pieces using a shackle 77. FIG. 32 shows the front of a truss connection assembly 75 which mounts on an end plate 76.

Figure 33:
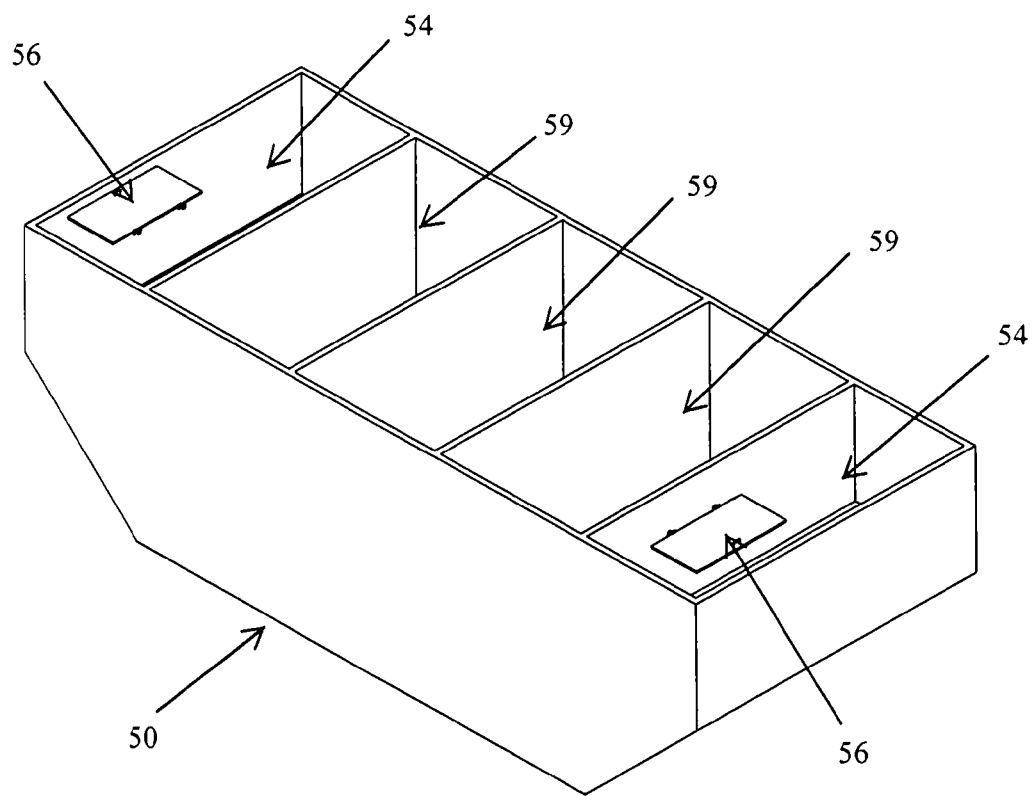
FIG. 33 is a schematic perspective view of the barge with the deck plate removed according to the preferred embodiment of the invention.

FIG. 33 reveals the barge 50 with the deck plate removed. The two end compartments are intended to be machinery and equipment rooms 54 with access doors 56. The three center compartments are ballast tanks 59 each with two bladders (not shown), one for water, and one for oil. Computer controller will control the levels of oil and water, depending on the barge mode of operation.

Figure 34:
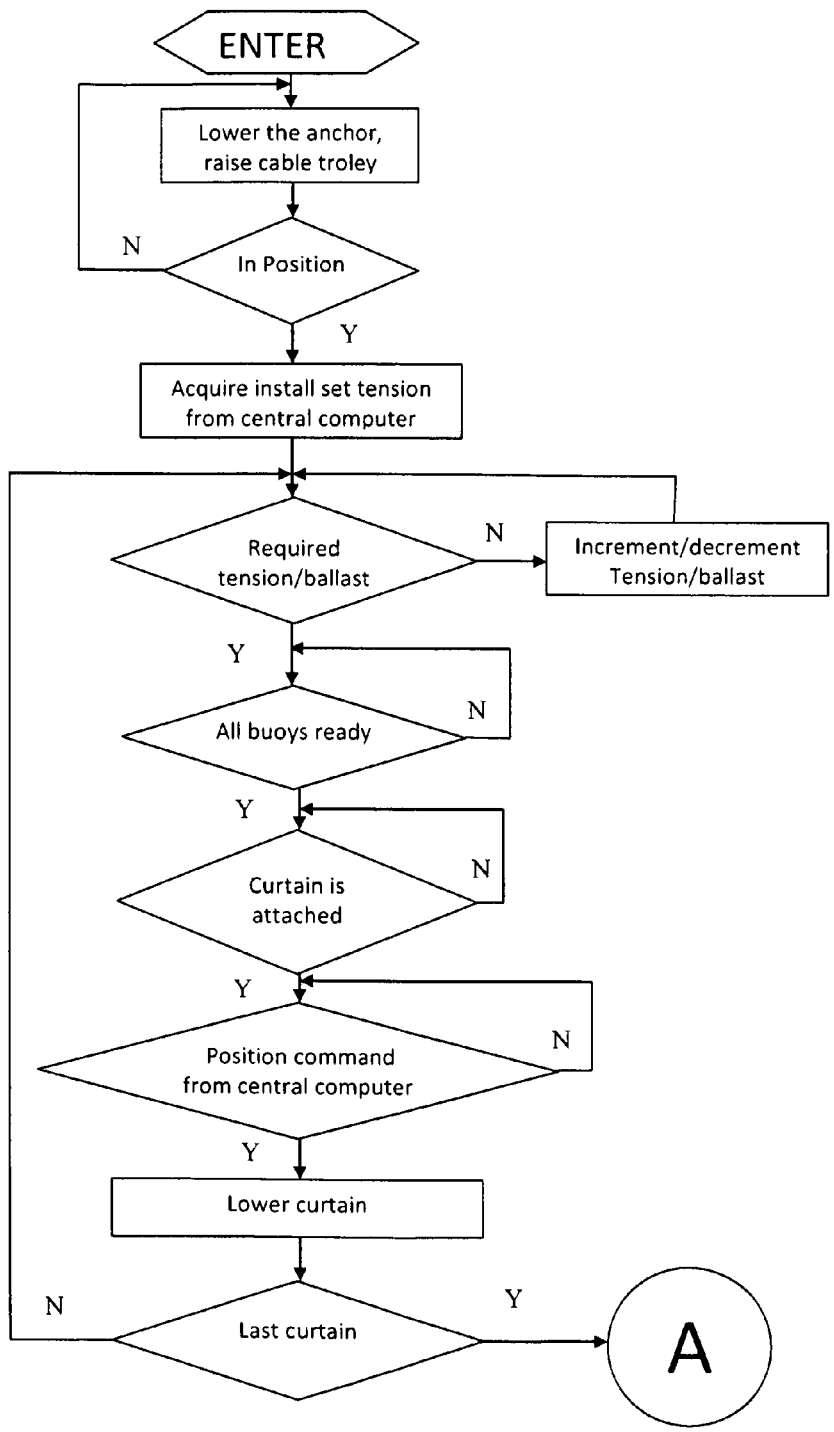
FIGS. 34, 35 and 36 are sections of a generalized high level flow chart for the buoy sectional computer control unit controller for installation, run and dismantle modes of operation according to the preferred embodiment of the invention.
Figure 35:
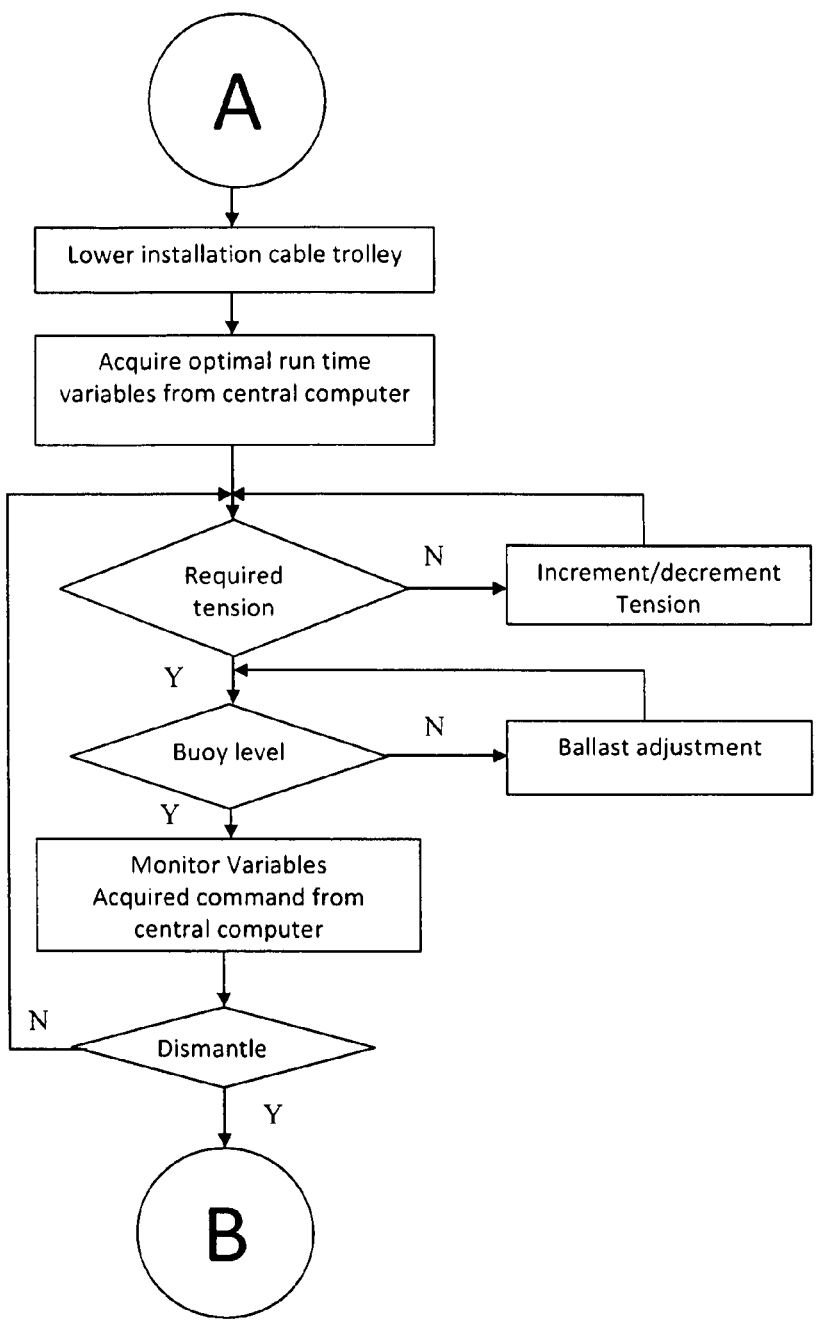
Figure 36:
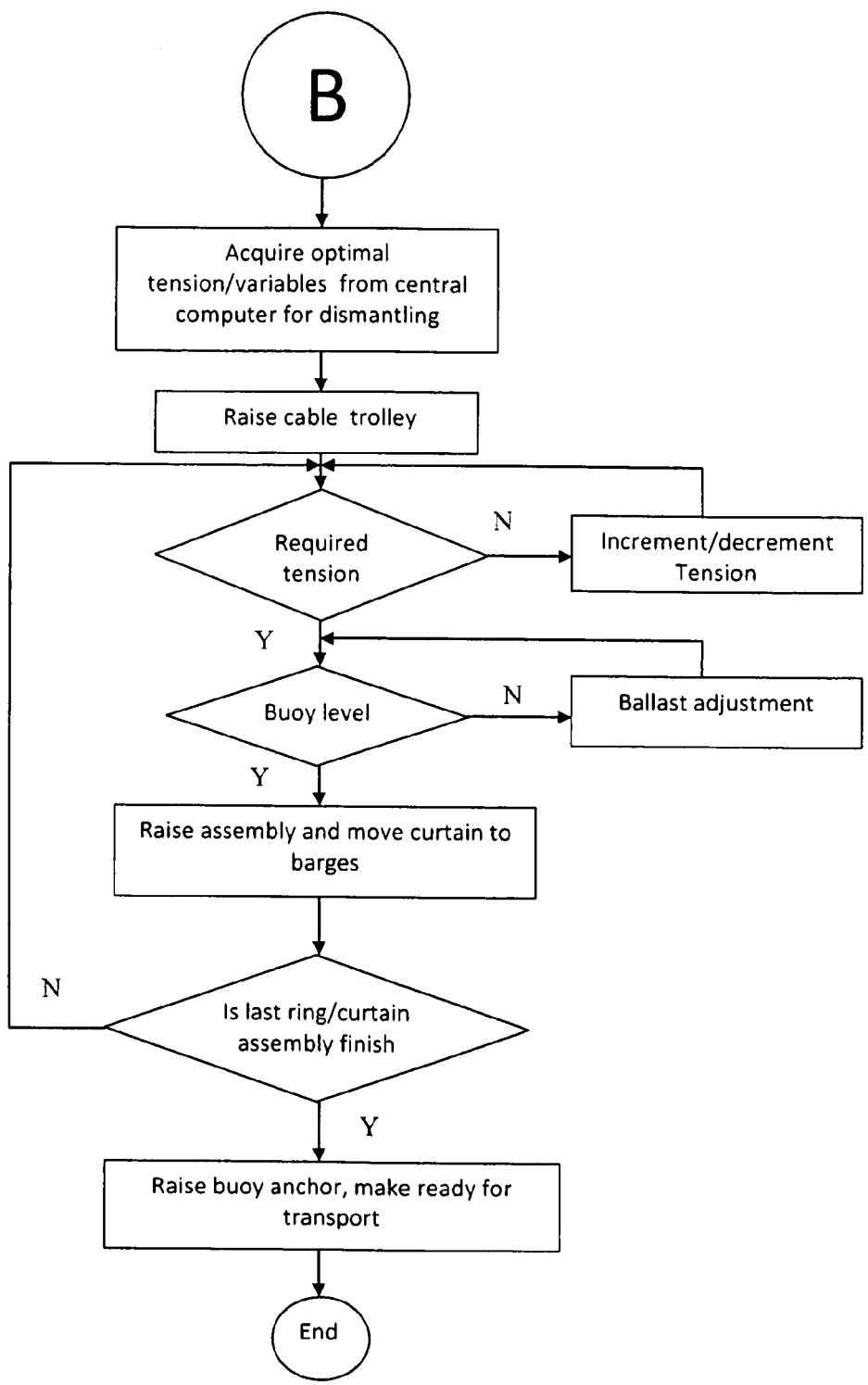

FIGS. 34, 35 and 36 are a generalized high level flow chart for a buoy sectional computer control unit of a respective buoy assembly 30 for installation, run and dismantle modes of operation.

As noted with respect to FIG. 28, each buoy sectional computer control unit 400 is operatively connected to containment machine central computer control unit 200. Upon receiving an appropriate signal from containment machine central computer control unit 200, buoy sectional computer control unit 400 sends a signal to lower anchor 41 and raise cable trolley 36. The signals are exchanged between sensors at cable trolley 36 until cable trolley 36 is in position. A signal is then received from buoy sectional computer control unit 400 to set a tension for cables 31 in accordance with set points received from containment machine central computer control unit 200. Signals are received indicating the tension in respective cables 31, and if they are not at the set point, signals are sent to respective ballasts 40 to increase or decrease the ballast to maintain the proper tension in cables 31. The tension from the respective buoy assemblies 30 are transmitted to containment machine central computer control unit 200, and the foregoing signals are continued until each buoy assembly 30 is in its set position. Curtain/truss assemblies 100 are attached to respective buoy assemblies 30, and upon receipt of the signal from containment machine central computer control unit 200 via buoy sectional computer control unit 400, truss/curtain assemblies 100 are lowered into the body of water from respective buoy assemblies 30. Signals are exchanged between control units of respective cable trolleys 36 and containment machine central computer control units 200 via buoy sectional computer control units 400 so that cable trolleys 36 lower truss/curtain assemblies 200 for an optimal run time as established by containment machine central computer control unit 200.

The tension in respective cables 31 is monitored, and the tension is increased or decreased according to the measured tension. The required tension for respective cables 31 is achieved. The level of buoy assemblies 30 is adjusted by means of ballast adjustment signals exchanged between buoy sectional computer control units 400 and respective ballasts 40. All of the signals are monitored by means of communications with containment machine central computer control units 200.

When the contaminant in the body of water has been successfully removed, a dismantling process proceeds. Control signals for the tension in respective cables 31 are exchanged, and signals are transmitted to cable trolley 36 in each buoy assembly 30 to raise the respective cables. The tension in respective cables 31 is monitored, and appropriate adjustments are made and maintain the desired tension in cables 31. The respective levels of buoy assemblies 30 is also monitored, and signals are transmitted to respective ballasts 30 to maintain the buoys at the desired level. When buoy assemblies 30 reach the desired level, signals are transmitted to effect the raising of truss/curtain assemblies 30, and the latter are loaded into barges 50 by cranes 51. Each anchor assembly 41 is raised, and the respective buoy assemblies 30 are towed for storage.

Referring to the drawings and more particularly to FIG. 1, FIG. 2 and FIG. 3, contaminants seeping into the surrounding body of water are confined to the area shape and circumference defined by the buoy assembly 30 positions. This represents one embodiment of the apparatus and method of the present invention. Different configurations will depend on location of the spill, size of the spill, current and other weather conditions. The shape and materials of the component assemblies are determined by site analysis, risk assessment, marine conditions and the like.

Buoy assemblies 30 float on the water surface and are positioned in sequence above the ends of each truss assembly 70 and curtain assembly 90 section, forming a hexagon as in this embodiment as shown in FIGS. 1-3. Circles, triangles or other closed shapes as seen in FIG. 5 and FIG. 11 can be created based on weather and marine conditions to surround contaminant source. Truss/curtain assemblies 100 are attached to cables 31 that extend from winches 43, located in a buoy hull 35, through pulleys 44 and terminate at anchor pulleys 42 (FIG. 15) attached to anchors 41 which sit on or near the ocean floor. For additional stability the anchors 41 can be attached to the ocean floor if required. Buoy sectional computer control units 400 are located in the buoy assemblies 30 and are used to maintain a constant tension on the cables 31 and 105 at all times and to monitor and acquire data from sensors (discussed below) located on the truss assemblies 70 as defined with respect to FIG. 28. Each concentric series of truss assemblies 70 and curtain assemblies 90 are attached to the cables 31, lowered by the winches 43 and pulleys 44 and submerged. One end of each truss/curtain assembly 100 is securely attached to the cable 31 with a clamp 79, but the other end simply has a cable guide 82 through which the cable 31 is threaded and moves freely. Once containment ring 152 is completely submerged, the next containment ring 152 is attached and submerged in sequence to create a full length tubular barrier 55 anchored on the ocean floor. Curtain assemblies 90 are attached to the truss assemblies 70 with metal plates and bottom fasteners 95, and the sides of each curtain assembly 90 are attached with side fasteners 93. Tubular barrier 55 is not sealed; rather it is open at the top and bottom allowing the contaminant to flow to the surface in a controlled and contained manner. There is enough space between the sea bed floor and the bottom curtain assembly 90 for pressure equalization.

The truss curtain assemblies 100 are weightless due to the buoyancy band and band flap 92 on each curtain assembly 90, and buoyancy tanks 72 are attached to the truss assemblies 70 using braces 73. There are end plates 76 and truss connection assemblies 75 at the end of each truss assembly 70. Truss assemblies 70 are loosely coupled together using shackles 77 so that the system is flexible and can adapt to a wide range of potential scenarios. Based on marine conditions, each truss assembly 70 can be further stiffened to resist lateral forces by using rigid truss connectors 78 and/or adding stiffeners 74.

During installation as seen in FIG. 2, the truss/curtain assemblies 100 have been loaded onto the barges 50, and tug boats tow the buoy assemblies 30, each having an anchor 41, and barges 50 into position. Oceanic/marine conditions are assessed and dictate the overall shape of the closed system to minimize marine forces. GPS readings are used to position the floating buoy assemblies 30. Because buoy assemblies 30 are modules, any shape can be created to accommodate the site specific marine conditions. During erection, buoy assemblies 30 are attached to the barges 50 and cranes 51 on barges 50 to move and place the truss/curtain assemblies 100 into position. A barge hull 52 is large so that it can accommodate the full length of truss assemblies 70 on deck and can internally store fire equipment, pumps, motors, safety equipment, generators and computer control units etc. There are access doors 53 on the barge floor to provide access to the interior.

FIG. 15 depicts buoy assembly 30. Ballasts 40 located in buoy assembly 30 and two adjustable keels 34 projecting from the bottom of buoy assembly 30, control upright floatation. Buoy assemblies 30 are positioned a truss length apart. From a plan perspective, buoy assemblies 30 form the outline which will ultimately determine the shape of closed containment assembly 10. Hull 35 of buoy assembly 30 is large enough for humans to stand on buoy assembly deck 45 comfortably. Ballasts 40, control pumps (not shown), winches 43 (not shown) and electronic buoy sectional computer control units are located inside respective buoy assemblies 30. Anchor 41 hangs from the bottom of buoy assembly 30 and is attached to cables 31 that run through cable guide pipes 39 around pulleys 44 and are wound around the winches 43 inside buoy assembly 30. There are water seals 33 located at the top of buoy assembly 30 to prevent water entering the buoy chamber. The length of cable 31 is determined by the location of the contaminant and the depth of the body of water that needs to be protected. To access cables 31 for curtain assembly 90 attachment during the erection phase, a cable trolley 36 moves along the trolley carriage 38, hooks cable 31 and moves it to the top of the trolley carriage 38 located on the front of the buoy 30. FIG. 18 shows the side view with cable trolley 36 fully extending cable 31 for easy access.

The installation carriage consisting of a cable trolley 36, roller 37 and trolley carriage 38 mounted on the side of buoy assembly 30 are used so that the external cables 31 are accessible during the loading embodiment and to provide support on cables 31. Winches 43 provide tension on cables 31.

Truss/curtain assemblies 100 shown in FIG. 20 are available as modules and are assembled when needed. The shape, length and material of truss assembly 70 are determined based on marine conditions in the vicinity of the offshore oil drilling, production, processing, storage platforms or the like that the invention is meant to protect in the event of a contaminant spill. Buoyancy tanks 72 are part of the assembly and are pre-attached to the truss assemblies 70 using braces 73 (FIG. 23). Tanks 72 can be pressurized for different depths. Truss end-plates 76 and shackles 77 are used to loosely connect the truss assemblies 70 end-to-end during deployment.

FIG. 4 depicts the preferred embodiment of the present invention for use in the event of a strong current. A combination of three buoy assemblies 30, anchored into position to support a set of rigid truss/curtain assemblies 100 in the shape of a V to deflect current forces away from containment assembly 10. The rigid truss/curtain assembly 100 is made of steel and the like. A buoyant material 101 is sandwiched between two rigid plates of truss/curtain assembly 100. The containment assembly 10 is in the shape of a hexagon with concentric curtain/trusses assemblies 100 extending to the floor of the body of water. An attached deflection unit 91 has been added to direct/deflect current. Deflection unit 91 is comprised of three buoy assemblies 30, each having an anchor 41, assemblies and curtain/truss assemblies 90, 70 in a V shape.

FIG. 5 indicates the preferred embodiment of the present invention for coping with marine conditions which require a containment assembly which is long, narrow and pointed at both ends positioned parallel to water current. Each rigid truss/curtain assembly 100 is made of steel plates. Buoyant material 101 is located between the plates. Buoy assemblies 30 are positioned above the ends of each truss assembly 70. The truss/curtain assemblies 70, 90 are attached to cables 31 that extend from winches 43 located in buoy assemblies 30 and terminate at anchor pulleys 42 attached to an anchor 41 which sits on the ocean floor.

FIG. 7 shows the preferred embodiment of the present invention wherein a side buoy assembly 30 with an anchor 41 is located off the side. The tension of a side cable 105 can be controlled to direct the closed system off to an angle.

During hurricanes or other weather conditions, sealing cover 110 as shown in FIG. 10 can be positioned over the exposed contaminant that has collected on the water surface and contained. Barges 50 with crane 51 assembled thereon are re-deployed to position sealing cover 110 and scrubbers 111.

The invention has been described in detail with particular reference to the preferred embodiment, but variations and modifications may occur to those skilled in the art from the foregoing description and from the appended claims.

We claim:

1. A containment machine for containing contaminant in a body of water, said containment machine comprising:
    a set of cooperating buoy assemblies for being arranged in the body of water to form an upper end of a containment barrier when said containment barrier is in a body of water, said containment barrier having a shape for confining the flow of a contaminant in the body of water, said buoy assemblies respectively comprising:
        a buoy hull for holding components of said respective buoy assemblies;
        buoyancy structure for supporting said buoy hull afloat in the body of water;
        ballast structure for maintaining the stability of said buoy assembly, said ballast structure including a ballast regulating device for regulating the operation of said ballast structure;
        cable raising and lowering structure including a cable raising and lowering structure regulating device for regulating the operation of said cable raising and lowering structure; and
        a cable structure for being operatively connected to said cable raising and lowering structure;
        sensors operatively attached to said buoyancy structure and to said cable structure for generating buoyancy status signals indicative of the buoyancy of said buoyancy structure, and tension status signals indicative of the tension in said cable structure;
    a barrier structure for being operatively connected to said respective buoy assemblies to be disposed in the body of water, and for cooperating with other barrier structures in cooperating ones of said set of buoy assemblies to form part of a containment barrier around the contaminant, said barrier structure having depth components which assume different locations when said barrier structure is in a body of water;
    sensors operatively attached to said depth components for generating signals indicative of the location of said depth components; and
    a containment machine central computer control for receiving input signals and for generating buoy assembly control signals for controlling the respective buoy sectional computer controls in response to said input signals;
    wherein said buoy assemblies further respectively comprise:
        a buoy sectional computer control being operatively connectable to said containment machine central computer control and to sensors operatively attached to said respective buoyancy structure, to said cable structure and to said respective barrier structures, for receiving control signals from said containment machine central computer control and for receiving both said buoyancy/tension signals and said buoy assembly control signals, and for generating output control signals to said respective ballast regulating device, and to said cable raising and lowering structure regulating device for continuously adjusting the ballast in said ballast structure to maintain a desired tension in said cable structure and to maintain relative to each other the position of the respective barrier structures attached to said respective buoy assemblies according to a selected criteria.

2. A containment system according to claim 1 wherein said barrier structure includes at least one barrier item having a compact condition and an enlarged condition; and further including stiffening structure for preventing said barrier item from collapsing upon itself when in a body of water.

3. A containment machine according to claim 2 wherein said barrier item comprises at least one curtain assembly, said stiffening structure comprises at least one truss assembly attachable to said at least one curtain assembly, and said barrier structure comprises at least one truss/curtain assembly.

4. A containment machine according to claim 1 wherein said sensors attached to said cable structure comprise absolute position sensors attached to said cable structure for generating the location of a position on said cable structure relative to the length of said cable structure in the body of water.

5. A containment machine according to claim 1 and further including a containment machine control system with control commands and control loops for receiving input signals from said sensors and comparing the input signals with preset values, said control loops being operatively connected to said containment machine central computer control and buoy sectional computer controls for data transmission in real time, said containment machine central computer control exchanging data in real time with said containment machine control systems loops to periodically adjust machine operation relative to set points in real time, said containment machine central control periodically transmitting set point signals in real time to said respective buoy sectional computer controls to establish set points for said respective output control signals generated by said respective buoy sectional computer controls.

6. A containment machine according to claim 5 and further including a data historian acquisition device, said data historian acquisition device acquiring time series stamped data for analysis by an operation, and selectively changing said feedback loops for more optimal operation.

7. A containment machine according to claim 5 in combination with at least one barge machine for holding, distributing and maintaining equipment, the equipment including the items including barrier structures, ballast structure and generators, said barge machine comprising:
respective equipment sensors and equipment sectional computer controls operatively connected to the respective items of equipment for generating equipment status signals indicative of the status of the respective items of equipment and for receiving equipment control signals to regulate the condition of the respective items of equipment;
a barge machine central control for receiving input signals and for generating equipment control signals for controlling the respective equipment sectional computer controls in response to said input signals; and
a barge machine control system with barge machine control commands and barge machine control loops for receiving input signals from said equipment sensors and comparing the input signals with preset values, said barge machine control loops being operatively connected to said barge machine central computer control and equipment sectional computer controls for data transmission in real time, said barge machine central computer control exchanging data in real time with said barge machine control systems loops to periodically adjust barge machine operation relative to set points in real time, said barge machine central control periodically transmitting set point signals in real time to said respective equipment sectional computer controls to establish set points for said respective output control signals generated by said respective equipment sectional computer controls.

8. A containment machine according to claim 5 wherein said containment machine control system includes a SCADA system.

9. A containment machine according to claim 5 wherein said barge machine control system includes a SCADA system.

10. A containment machine according to claim 1 wherein said cable raising and lowering structure for the respective buoy assemblies comprises:
a winch apparatus operatively connected to said cable structure for raising and lowering said cable structure and said respective barrier structures attached to said respective cable structure, said respective cable raising and lowering structure having a sensor for generating winch apparatus location signals indicative of the location of said winch apparatus to said buoy sectional computer control, said buoy sectional computer control generating responsive winch apparatus location signals to said containment machine central computer control and for receiving winch apparatus control signals to adjust the location of said respective cable structure and said respective barrier structures attached to said cable during installation and deinstallation of respective barrier structures in a body of water.

11. A containment machine according to claim 10 and further including cable trolley structure for being movable relative to said buoy hull for effecting the raising and lowering of said cable structure, said cable structure having a cable trolley sensor for generating cable trolley structure location signals to said buoy assembly controller indicative of the location of said cable trolley structure.

12. A containment machine according to claim 1 and further including communication structure for communicating via personal area networks with other communication networks.

13. A containment machine according to claim 1 wherein said communication machine central computer control network includes human control acceptance structure for accepting control parameters entered by a human operator.

14. A containment machine according to claim 1 wherein:
said ballast structure further includes:
ballast control pumps;
said buoyancy structure further includes:
at least one keel;
said barrier structure comprises at least one truss/curtain assembly; and said cable raising and lowering structure includes:
a winch apparatus operatively connected to said cable structure for raising and lowering said cable structure and said truss/curtain assemblies attached to said respective cable structure, said respective cable raising and lowering structure having a sensor for generating location-indicating signals indicative of the location of said winch apparatus to said buoy sectional computer control, said buoy sectional computer control transmitting responsive winch location control signals to said respective cable raising and lowering structure regulating device to control the operation of said winch apparatus according to winch location control signals received from said buoy sectional computer control, during the installation and deinstallation of said respective truss/curtain assemblies in a body of water;
and said cable structure further includes:
at least one anchor for holding an end of said cable structure at the floor of the body of water.

15. A containment machine according to claim 1 wherein said barrier structure comprises truss/curtain assemblies, said truss/curtain assemblies respectively comprise:
a truss assembly including an elongated truss for being attached at its opposite ends to a pair of said cable structures extending into the body of water from a pair of adjacent buoy assemblies, attachment structure for attaching at least one buoyancy tank to said elongated truss, end connection structure for being connected to end connection structure of an adjacent elongated truss for cooperating with a set of said elongated trusses to form a closed rigid truss assembly as part of a containment arrangement; and
a curtain assembly having opposing ends and opposing sides, a buoyancy and flap band at an upper end of said curtain assembly when said truss/curtain assembly is disposed in the body of water, curtain attaching devices at the lower end of said curtain assembly for attaching the lower end of said curtain assembly to said truss assembly when said truss/curtain assembly is disposed in the body of water, and side curtain attaching devices for attaching said opposing sides of said curtain assembly to corresponding sides of adjacent curtain assemblies to form a curtain assembly portion of said containment arrangement in the body of water.

16. A containment machine according to claim 15 wherein said containment arrangement is attachable to at least one other containment arrangement above or below said containment arrangement to form at least part of said containment barrier.

17. A containment machine according to claim 1 and further including at least one buoy assembly locatable in the body of water apart from said containment barrier, and at least one barrier structure connectable to one of said buoy assemblies in the body of water and said at least one buoy assembly for directing and deflecting currents of water in the body of water to help maintain the location of said containment barrier in the body of water.

18. A containment machine according to claim 1 wherein said buoy assembly further comprises:
a pair of keels extending from said buoy hull;
said cable structure is a pair of cables connected to at least one anchor;
said cable raising and lowering structures comprise:
a pair of winches inside said buoy hull; and
a pulley associated with each of said winches for holding one of said cables as said respective cables move;

wherein said barrier structure comprises at least one truss/curtain assembly, said at least one truss/curtain assembly comprises a truss assembly and a curtain assembly, and wherein said buoy structure further comprises an installation trolley system for moving said cables for manual attachment of said truss assembly to said cables.

19. A containment machine according to claim 1 and further including sensors operatively connected to said containment machine central computer control for generating water condition signals indicative of the condition of said body of water, and structure in said containment machine central computer control for modifying said buoy assembly control signals according to said water condition signals.

20. A containment machine according to claim 1 wherein said respective buoy assemblies include a GPS device for generating location signals to said containment machine central computer control to indicate the location of said respective buoy assemblies.

21. A process for containing contaminant in a body of water, said process comprising the following steps:
arranging a set of cooperating buoy assemblies in the body of water to define an upper end of a containment barrier to form a shape to confine the flow of a contaminant in the body of water, the buoy assemblies respectively comprising a buoy hull for holding components of the respective buoy assemblies, buoyancy structure for supporting the buoy hull afloat in the body of water, ballast structure for maintaining the stability of the buoy assembly, the ballast structure including a ballast regulating device for regulating the operation of the ballast structure, and cable raising and lowering structure including a cable raising and lowering structure regulating device for regulating the operation of the cable raising and lowering structure;
providing a cable structure for being operatively connected to said cable raising and lowering structure;
attaching sensors to the buoyancy structure and to the cable structure for generating buoyancy signals indicative of the buoyancy of said buoyancy structure, and for generating tension signals indicative of the tension in said cable structure;
connecting a buoy sectional control to the sensors, to the buoyancy structure, to the ballast regulating device, and to the cable raising and lowering structure regulating device;
connecting at least one barrier structure to the buoy sectional control and to the respective buoy assemblies, and disposing the barrier structures in the body of water, and enabling the barrier structures to cooperate with other barrier structures attached to other ones of the set of buoy assemblies to form part of a containment barrier to confine the flow of the contaminant in the body of water; and
attaching sensors to the respective barrier structures for generating signals indicative of the location of the respective barrier structures;
employing a containment machine central computer control connected to the respective buoy sectional computer controls for receiving input signals and for generating buoy assembly control signals for controlling the respective buoy sectional computer control in response to the input signals;
employing a containment machine control system with control commands and control loops for receiving input signals from the respective sensors and comparing the input signals with preset values, the control loops being operatively connected to the containment machine central computer control and buoy sectional computer controls for data transmission in real time, the containment machine central computer control exchanging data in real time with the containment machine control systems loops to periodically adjust machine operation relative to set points in real time, the containment machine central control periodically transmitting set point signals in real time to the respective buoy sectional computer controls to establish set points for the respective output control signals generated by the respective buoy sectional computer controls; and employing the respective buoy sectional computer controls for receiving control signals from the containment machine central computer control system and for receiving both the buoyancy/tension signals and the buoy assembly control signals, and for generating output control signals to the respective ballast regulating device, and to cable raising and lowering structure regulating device for periodically adjusting the ballast in the respective ballast structures to maintain a desired tension in the respective cable structures and to maintain relative to each other the position of the respective barrier structures attached to the respective buoy assemblies according to a selected criteria.

\* \* \* \* \*